(12) United States Patent
Huang et al.

(10) Patent No.: US 12,346,502 B2
(45) Date of Patent: Jul. 1, 2025

(54) INITIATING A COMPUTING DEVICE INTERACTION MODE USING OFF-SCREEN GESTURE DETECTION

(71) Applicant: Google LLC, Mountain View, CA (US)

(72) Inventors: Xuelin Huang, Mountain View, CA (US); Shumin Zhai, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/040,544

(22) PCT Filed: Aug. 25, 2020

(86) PCT No.: PCT/US2020/070460
§ 371 (c)(1),
(2) Date: Feb. 3, 2023

(87) PCT Pub. No.: WO2022/046151
PCT Pub. Date: Mar. 3, 2022

(65) Prior Publication Data
US 2024/0256047 A1 Aug. 1, 2024

(51) Int. Cl.
*G06F 3/048* (2013.01)
*G06F 1/16* (2006.01)
(Continued)

(52) U.S. Cl.
CPC ............ *G06F 3/017* (2013.01); *G06F 1/1694* (2013.01); *G06F 3/0346* (2013.01);
(Continued)

(58) Field of Classification Search
CPC ...... G06F 3/017; G06F 1/1694; G06F 3/0346; G06F 3/04817; G06F 3/0482;
(Continued)

(56) References Cited

U.S. PATENT DOCUMENTS

| 8,587,530 B2 | 11/2013 | Morimoto et al. |
| 8,775,966 B2 | 7/2014 | Stolyarov et al. |

(Continued)

FOREIGN PATENT DOCUMENTS

| CN | 103136508 A | 6/2013 |
| CN | 104685451 A | 6/2015 |

(Continued)

OTHER PUBLICATIONS

Zhang et al., "Beyond the touchscreen: an exploration of extending interactions on commodity smartphones" Published Aug. 12, 2016, 24 pp.

(Continued)

*Primary Examiner* — Rashawn N Tillery
(74) *Attorney, Agent, or Firm* — Shumaker & Sieffert, P.A.

(57) ABSTRACT

An example method includes identifying, by a mobile computing device that includes a housing and a presence-sensitive display, and based on a first group of sensor signals provided at least by an inertial measurement unit included in one or more sensors, at least one first gesture that is performed at portions of the housing, wherein the one or more portions are separate from the display, initiating an interaction mode, outputting at least one visual or audio indicator for the interaction mode that is associated with a particular function of the mobile computing device, identifying, based on a third group of sensor signals provided by the one or more sensors, at least one second gesture that is performed at the one or more portions of the housing to confirm a user selection of the particular function, and, responsive to identifying the at least one second gesture, performing the particular function.

20 Claims, 12 Drawing Sheets

(51) Int. Cl.
*G06F 3/01* (2006.01)
*G06F 3/0346* (2013.01)
*G06F 3/04817* (2022.01)
*G06F 3/0482* (2013.01)
*G06F 3/04883* (2022.01)
*G06F 3/04886* (2022.01)
*G06F 3/16* (2006.01)

(52) U.S. Cl.
CPC ........ *G06F 3/04817* (2013.01); *G06F 3/0482* (2013.01); *G06F 3/04883* (2013.01); *G06F 3/04886* (2013.01); *G06F 3/167* (2013.01); *G06F 2200/1636* (2013.01)

(58) Field of Classification Search
CPC .. G06F 3/04883; G06F 3/04886; G06F 3/167; G06F 2200/1636
See application file for complete search history.

(56) References Cited

U.S. PATENT DOCUMENTS

| | | | |
|---|---|---|---|
| 9,235,278 | B1 | 1/2016 | Cheng et al. |
| 9,292,102 | B2 | 3/2016 | Nasiri et al. |
| 9,448,587 | B2 | 9/2016 | Park |
| 9,471,220 | B2 | 10/2016 | Zhai et al. |
| 9,489,129 | B2 | 11/2016 | Lee et al. |
| 9,672,588 | B1 * | 6/2017 | Doucette ................. G06F 3/011 |
| 2009/0262074 | A1 * | 10/2009 | Nasiri ................. G06F 3/04817 345/158 |
| 2009/0303204 | A1 | 12/2009 | Nasiri et al. |
| 2013/0100035 | A1 * | 4/2013 | Papakipos ............... G06F 1/169 345/173 |
| 2014/0168275 | A1 * | 6/2014 | Suzuki ................... G09G 5/373 345/661 |
| 2014/0333670 | A1 | 11/2014 | Agnetta et al. |
| 2014/0337791 | A1 * | 11/2014 | Agnetta ..................... G06F 3/16 715/784 |
| 2016/0188181 | A1 * | 6/2016 | Smith ................. G06F 3/04886 715/765 |
| 2016/0291731 | A1 * | 10/2016 | Liu ..................... G06F 3/04883 |
| 2017/0192465 | A1 * | 7/2017 | Lazaridis .............. G06F 3/0487 |
| 2017/0214781 | A1 | 7/2017 | Ichida et al. |
| 2017/0278291 | A1 * | 9/2017 | Young ..................... G06F 9/451 |
| 2017/0371450 | A1 * | 12/2017 | Heller .................... G06F 1/1694 |
| 2019/0228589 | A1 * | 7/2019 | Dascola .................... G06T 7/70 |
| 2021/0271318 | A1 * | 9/2021 | Bradley ............. G02B 27/0172 |
| 2022/0083211 | A1 * | 3/2022 | Nefulda .................. G06F 3/016 |
| 2023/0281887 | A1 * | 9/2023 | Wesner ................ G06V 30/186 382/182 |
| 2024/0256058 | A1 * | 8/2024 | Dahlgren ................. G06F 3/038 |

FOREIGN PATENT DOCUMENTS

| | | | | |
|---|---|---|---|---|
| CN | 104731317 A * | 6/2015 | ........... | G06F 3/0317 |
| CN | 109643167 A | 4/2019 | | |
| EP | 3130983 A1 * | 2/2017 | ........... | G06F 1/1613 |
| JP | 2005221816 A | 8/2005 | | |
| JP | 2009278294 A | 11/2009 | | |
| JP | 2012507802 A | 3/2012 | | |
| JP | 2016076778 A | 5/2016 | | |
| JP | 2017185924 A | 10/2017 | | |

OTHER PUBLICATIONS

Granell et al., "Less is more: Efficient back-of-device tap input detection using built-in smartphone sensors", Published Nov. 9, 2016, 7 pp.
Ling, et al., "SecTap: Secure back of device input system for mobile devices", Published 2018, 9 pp.
Fast Company, "You could soon control your phone by swiping everywhere—not just the screen", Published Oct. 17, 2019, 4 pp.
McGrath, et al., "Detecting tapping motion on the side of mobile devices by probabilistically combining hand postures", Published Oct. 8, 2014.
Vincent, "iOS 14 lets you tap the back of your iPhone to launch apps and a whole lot more", published Jun. 23, 2020, 6 pp.
International Search Report and Written Opinion of International Application No. PCT/US2020/070460, mailed May 20, 2021, 14 pp.
Annonymous, TapNet: Enabling Practical Off-Screen Tap Interaction with Cross-Device and Multi-Task Learning, UIST '20, Oct. 20-23, 2020, 13 pp.
International Preliminary Report on Patentability from International Application No. PCT/US2020/070460 dated Mar. 9, 2023, 9 pp.
Response to Communication Pursuant to Rules 161(1) and 162 EPC dated Apr. 4, 2023, from counterpart European Application No. 20768486.1, filed Oct. 5, 2023, 26 pp.
First Office Action and Search Report, and translation thereof, from counterpart Chinese Application No. 202080104578.5 dated Oct. 16, 2024, 17 pp.
Office Action, and translation thereof, from counterpart Japanese Application No. 2023-505446 dated Nov. 12, 2024, 6 pp.
Office Action, and translation thereof, from counterpart Korean Application No. 10-2023-7002827 dated Dec. 18, 2024, 22 pp.
Office Action, and translation thereof, from counterpart Japanese Application No. 2023-505446 dated Jun. 4, 2024, 9 pp.
Response to First Office Action dated Oct. 16, 2024, from counterpart Chinese Application No. 202080104578.5 filed Feb. 14, 2025, 42 pp.
Response to Office Action dated Dec. 18, 2024, from counterpart Korean Application No. 10-2023-7002827 filed Feb. 10, 2025, 66 pp.
Response to Office Action dated Nov. 12, 2024, from counterpart Japanese Application No. 2023-505446 filed Jan. 30, 2025, 20 pp.
Second Office Action from counterpart Chinese Application No. 202080104578.5 dated Apr. 8, 2025, 16 pp.

* cited by examiner

INITIATING A COMPUTING DEVICE INTERACTION MODE USING OFF-SCREEN GESTURE DETECTION

BACKGROUND

Existing computing devices, including mobile computing devices, may be configured to execute various different applications. In many cases, these computing devices provide touchscreens that enable a user to interact with the graphical user interfaces that are output by these applications. For example, a user may use one or more fingers to perform touch-based gestures at a touchscreen. Upon detecting these touch-based gestures at the touchscreen, the applications may perform one or more corresponding functions, such as selecting, moving, or manipulating objects that are displayed at the touchscreen. In other cases, certain computing devices may be configured to perform defined functions (e.g., capturing a screenshot, performing a device lock function) responsive to a user performing multiple tap gestures at a back housing of such devices.

SUMMARY

The present disclosure is directed to techniques for initiating a computing device interaction mode using off-screen gesture detection to detect one or more off-screen gestures (e.g., tap gestures) that are performed by a user, e.g., at one or more portions of the device housing. Upon initiating such an interaction mode, the computing device may be configured to perform one or more functions based on one or more additionally detected on-screen and/or off-screen gestures. Off-screen interaction may, in some cases, enable one-handed and/or eyes-free mobile interaction. In various examples, a mobile computing device may utilize one or more sensors (e.g., an inertial measurement unit that includes one or more of an accelerometer, a gyroscope, and/or a magnetometer) to detect off-screen gestures that are performed by a user at one or more portions of the device housing.

In one example, a method includes identifying, by a mobile computing device that includes a housing and a presence-sensitive display device, and based on a first group of sensor signals provided at least by an inertial measurement unit, at least one first gesture that is performed at one or more portions of the housing, wherein the one or more portions of the housing are separate from the presence-sensitive display device, and wherein the inertial measurement unit is included in one or more sensors of the mobile computing device; responsive to identifying the at least one first gesture, initiating, by the mobile computing device, an interaction mode; outputting at least one visual or audio indicator for the interaction mode that is associated with a particular function of the mobile computing device; identifying, by the mobile computing device and based on a third group of sensor signals provided by the one or more sensors, at least one second gesture that is performed at the one or more portions of the housing to confirm a user selection of the particular function that is associated with the at least one visual or audio indicator for the interaction mode; and responsive to identifying the at least one second gesture, performing, by the mobile computing device, the particular function.

In another example, a mobile computing device includes a presence-sensitive display device, a housing that is coupled to the presence-sensitive display, one or more sensors that include an inertial measurement unit, at least one processor, and a computer-readable storage device. The computer-readable storage device is configured to store instructions that are executable by the at least one processor to: identify, based on a first group of sensor signals provided at least by the inertial measurement unit, at least one first gesture that is performed at one or more portions of the housing, wherein the one or more portions of the housing are separate from the presence-sensitive display device; responsive to identifying the at least one first gesture, initiate an interaction mode; output at least one visual or audio indicator for the interaction mode that is associated with a particular function of the mobile computing device; identify, based on a third group of sensor signals provided by the one or more sensors, at least one second gesture that is performed at the one or more portions of the housing to confirm a user selection of the particular function that is associated with the at least one visual or audio indicator for the interaction mode; and responsive to identifying the at least one second gesture, perform the particular function.

In another example, a computer-readable storage device stores instructions that, when executed, cause at least one processor of a mobile computing device to perform operations. These example operations include: identifying, based on a first group of sensor signals provided at least by an inertial measurement unit, at least one first gesture that is performed at one or more portions of a housing of the mobile computing device, wherein the one or more portions of the housing are separate from a presence-sensitive display device, and wherein the inertial measurement unit is included in one or more sensors of the mobile computing device; responsive to identifying the at least one first gesture, initiating an interaction mode; outputting at least one visual or audio indicator for the interaction mode that is associated with a particular function of the mobile computing device; identifying, based on a third group of sensor signals provided by the one or more sensors, at least one second gesture that is performed at the one or more portions of the housing to confirm a user selection of the particular function that is associated with the at least one visual or audio indicator for the interaction mode; and responsive to identifying the at least one second gesture, performing the particular function.

The details of one or more examples are set forth in the accompanying drawings and the description below. Other features, objects, and advantages of the disclosure will be apparent from the description and drawings, and from the claims.

DETAILED DESCRIPTION

Figure 1A:
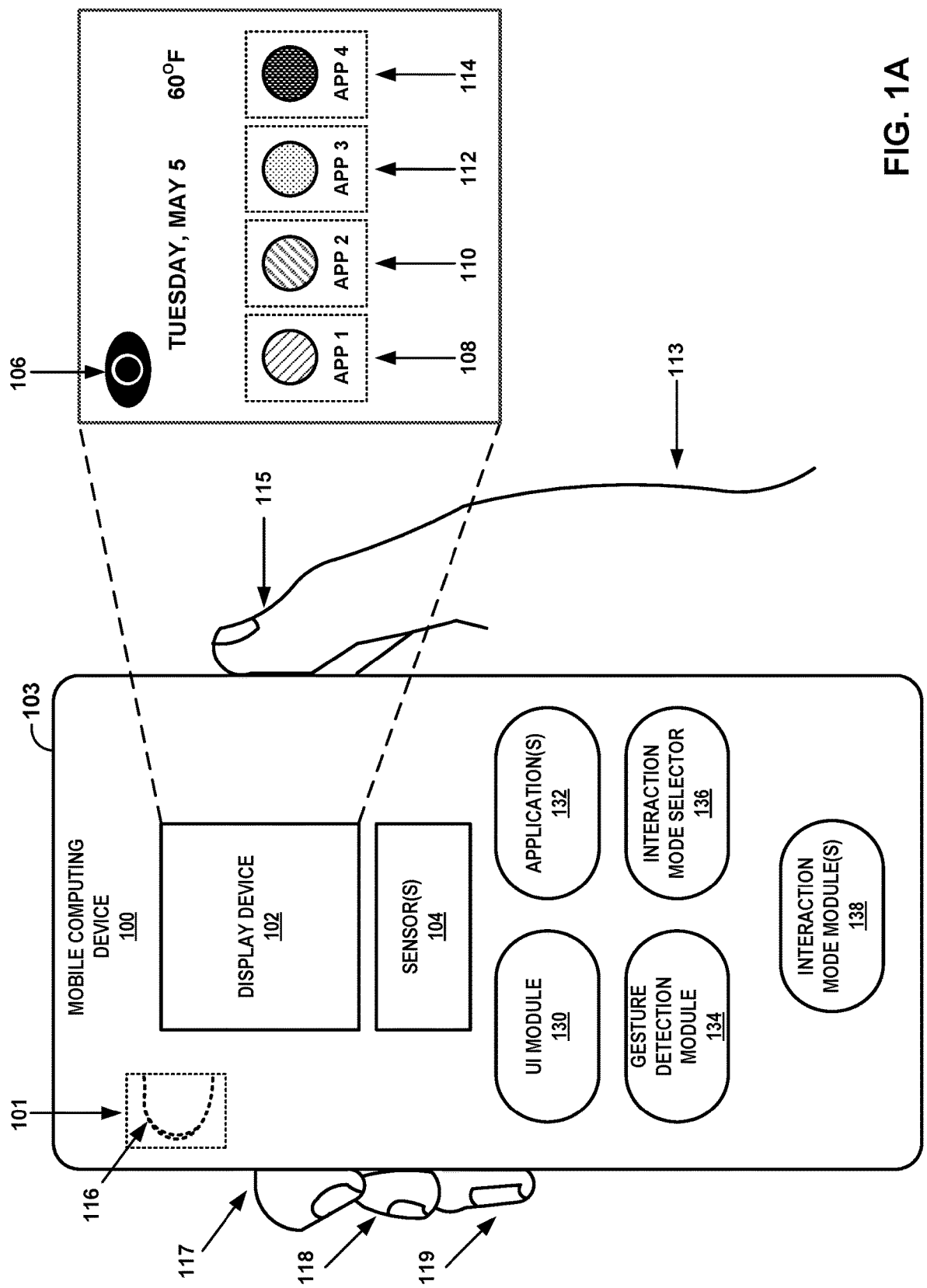
FIGS. 1A-1C are conceptual diagrams illustrating an example mobile computing device that is configured to initiate an interaction mode using off-screen gesture detection, in accordance with one or more aspects of the present disclosure.
Figure 1B:
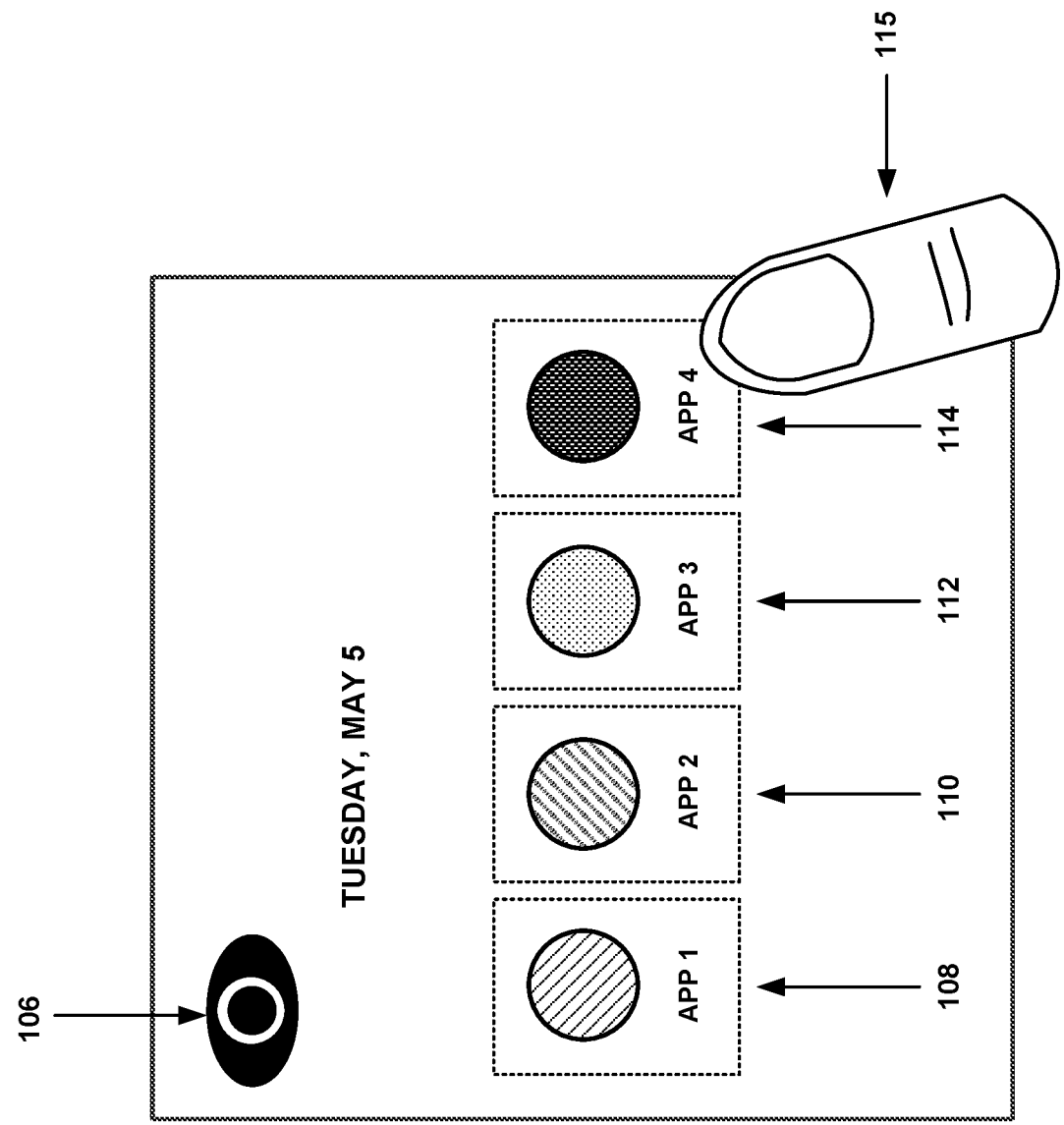
Figure 1C:
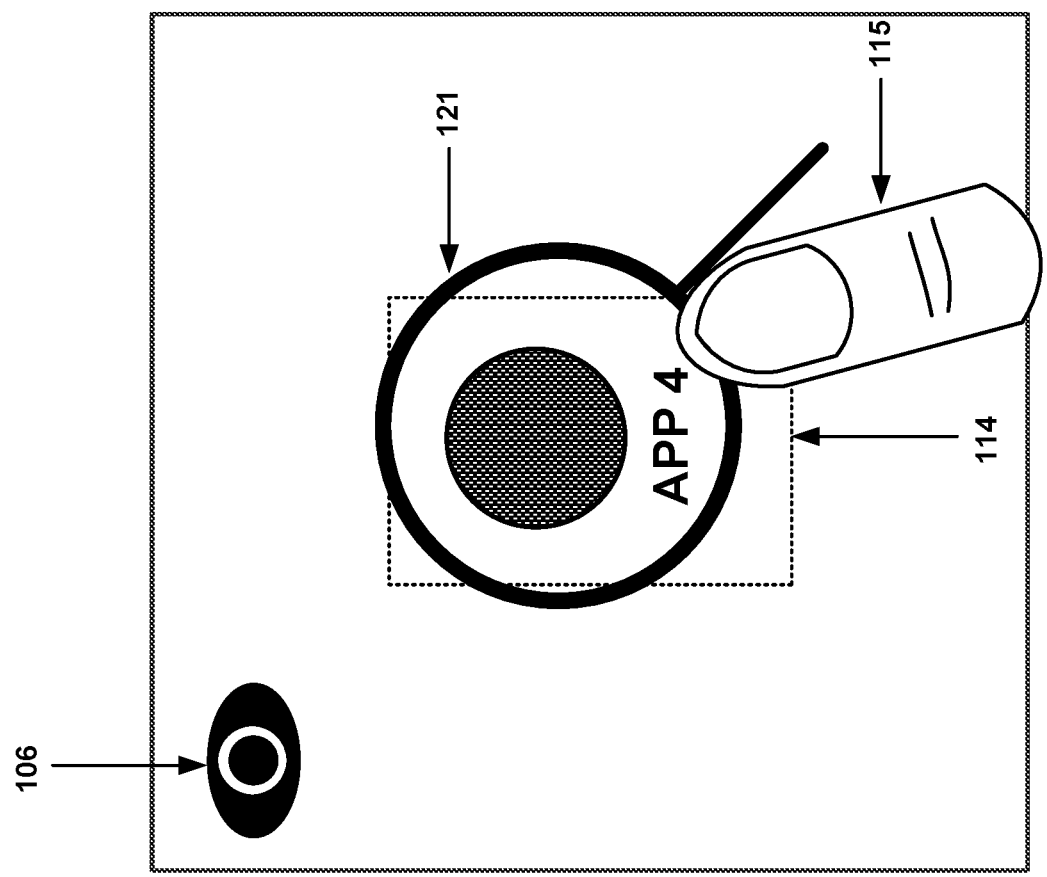

FIGS. 1A-1C are conceptual diagrams illustrating an example mobile computing device 100 that is configured to initiate an interaction mode for mobile computing device 100 using off-screen gesture detection, in accordance with one or more aspects of the present disclosure. Examples of mobile computing device 100 may include, but are not limited to, a mobile phone, a tablet computer, a personal digital assistant (PDA), a portable gaming device, a portable media player, a wearable computing device (e.g., a watch, a wrist-mounted computing device, a head-mounted computing device), or other type of computing device. As will be described in further detail below, mobile computing device 100 may be or include one or more processors. Mobile computing device 100 includes a display device 102 (e.g., a presence-sensitive display device) and one or more sensors 104. Sensors 104 may include any number of one or more sensors, such as touch or presence-sensitive sensors, microphones, internal measurement units (e.g., one or more gyroscopes, accelerometers, magnetometers), barometers, camera sensors, optical sensors, temperature sensors, and the like. In some cases, one or more of sensors 104 may be included in or otherwise associated with display device 102 (e.g., when display device 102 comprises a presence-sensitive display).

In addition, mobile computing device 100 also includes a housing 103. Housing 103 may include one or more portions, such as one or more front portions, one or more back portions, and one or more side portions (e.g., left-side portions, right-side portions, top-side portions, bottom-side portions). In various examples, the front side of mobile computing device 100 may include display device 102 and one or more front portions of housing 103. The rear or back side of mobile computing device 100, which is positioned opposite to the front side of mobile computing device 100, may include one or more back portions of housing 103. The remaining sides or edges of mobile computing device 100, which are adjacent to the front and back sides of mobile computing device 100, may include one or more side portions of housing 103. Housing 103 may or may not include display device 102. One or more portions of housing 103 (e.g., one or more side and/or back portions of housing 103) are separate and distinct from display device 102.

Display device 102 may function as an input device and/or an output device for computing device 100. Display device 102 may be implemented using various technologies. For instance, display device 102 may function as an input device using a presence-sensitive input device, such as a resistive touchscreen, a surface acoustic wave touchscreen, a capacitive touchscreen, a projective capacitance touchscreen, a presence-sensitive screen, an acoustic pulse recognition touchscreen, a presence-sensitive screen that detects motion via radar technology, or another presence-sensitive technology. As noted above, in certain cases, one or more of sensors 104 may be included in or otherwise associated with display device 102. Display device 102 may function as an output device using any of one or more display devices, such as a liquid crystal display (LCD), dot matrix display, light emitting diode (LED) display, organic light-emitting diode (OLED) display, e-ink, or similar monochrome or color display capable of outputting visible information to a user of mobile computing device 100. For example, display device 102 may present output associated with various user interfaces of applications 132 executing at mobile computing device 100. A user may interact with a respective user interface of each of applications 132 to cause computing mobile device 100 to perform operations relating to corresponding application functionality.

Figure 2:
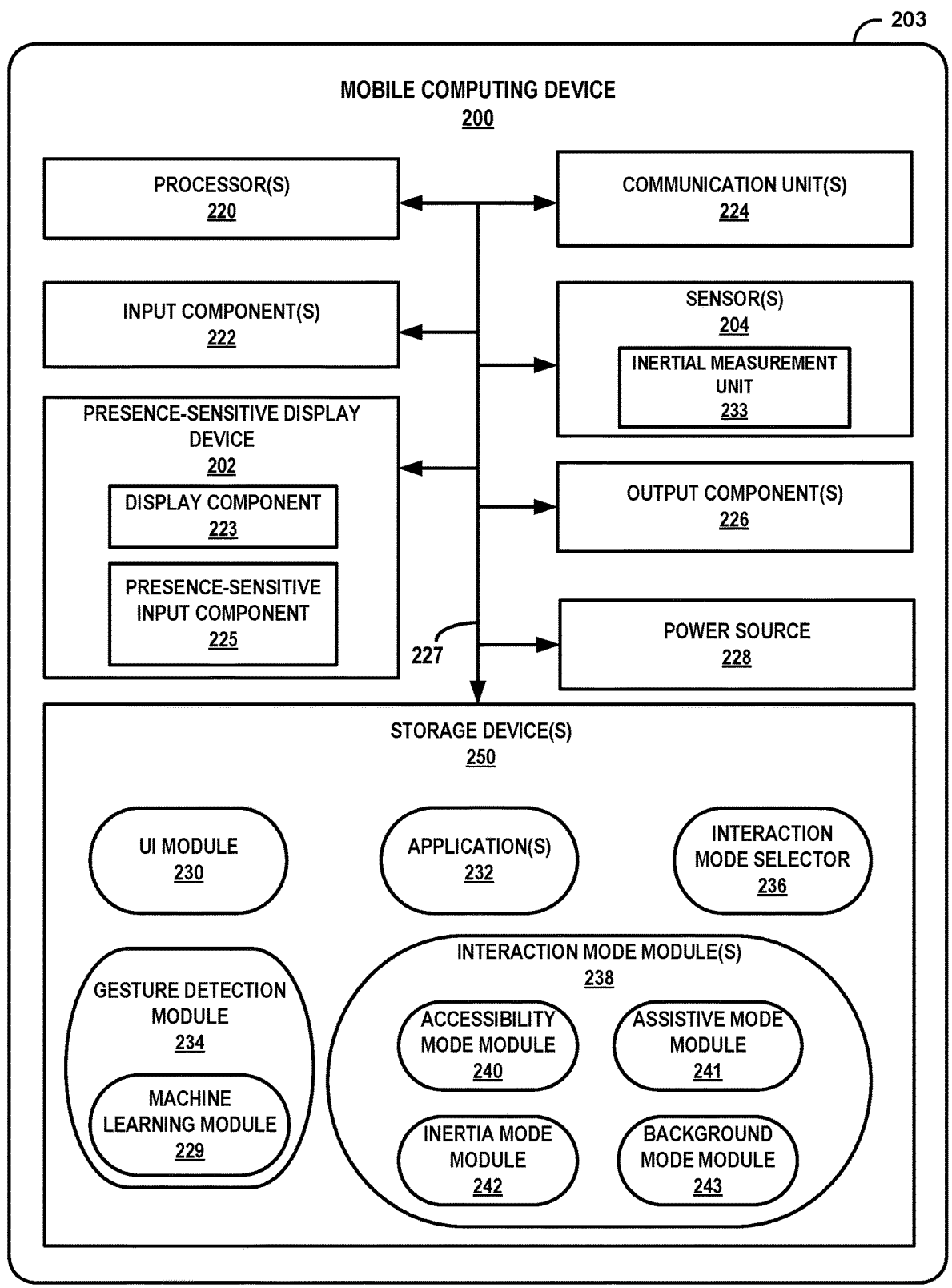
FIG. 2 is a block diagram illustrating an example mobile computing device, in accordance with one or more aspects of the present disclosure.

In some examples, mobile computing device 100 may include one or more communication units (such as shown in FIG. 2). These communication units may send data to and/or receive data from one or more other computing devices. In some examples, the communication units support wireless and/or wired communication, and they may send and/or receive data using any variety of communication protocols.

Mobile computing device 100 is configured to execute UI module 130, gesture detection module 134, interaction mode selector 136, and one or more interaction mode modules 138. UI module 130, applications 132, gesture detection module 134, interaction mode selector 136, and interaction mode modules 138 may perform operations described herein using any combination of software, hardware, and/or firmware residing in and/or executing at mobile computing device 100. Mobile computing device 100 may execute modules 130, 134, 136, 138 and applications 132 using one or more processors. Mobile computing device 100 may, in some cases, execute modules 130, 134, 136, 138 and applications 132 as one or more virtual machines executing on underlying hardware. Modules 130, 134, 136, 138 and applications 132 may be implemented in various ways. For example, any of modules 130, 134, 136, 138 and/or applications 132 may be implemented as a downloadable or pre-installed application or "app." In some examples, one of more of these may execute as a service of an operating system or computing platform.

Applications 132 of mobile computing device 100 may perform various functions or access one or more services for mobile computing device 100. An e-mail application, a camera application, a calendar application, a messaging application, a social media application, a travel application, a game application, a stock application, and a weather application are all examples of applications 132.

UI module 130 may cause display device 102 to present a graphical user interface to a user. For example, the graphical user interface may include graphical elements (e.g., indications) displayed at various locations of display device 102. UI module 130 may, in some cases, act as an intermediary between various components, applications, and/or modules of mobile computing device 100 to make determinations based on input detected by display device 102 and to generate output presented by display device 102. For instance, UI module 130 may receive information from display device 102 related to input detected by display device 102 and transmit the input information to one or more of modules 130, 134, 136, 138, and/or applications 132. UI module 130 may also receive output information from modules 130, 134, 136, 138, and/or applications 132 and provide the output information for display at display device 102.

A user may actively interact with mobile computing device 100 over time. Mobile computing device 100 may provide one or more interaction modes with which the user may interact with mobile computing device 100, such as with one or more of applications 132 during execution. In many cases, the user may perform one or more gestures in order to interact with mobile computing device 100.

Using display device 102 as the sole method of mobile device input (e.g., when display device 102 comprises a presence-sensitive display such as a touchscreen) may be increasingly challenged by certain limitations. For example, the difficulty of one-handed use and visual information occlusion by an operating finger may be two of such limitations. As a result, the present disclosure describes techniques for utilizing not only on-screen interaction with display device 102, but also off-screen interaction using existing sensors 104 on mobile computing device 100.

For example, sensors 104 may include an inertial measurement unit (IMU) (e.g., inertial measurement unit 233 of FIG. 2) that includes one or more gyroscopes, accelerometers, and/or magnetometers, in addition to other sensors associated with display device 102 (e.g., presence-sensitive sensors). Based on input provided by sensors 104, gesture detection module 134 may, in various examples and as described in further detail below, use a multi-input, multi-output convolutional neural network for off-screen gesture (e.g., tap) recognition. This detection method enables prediction of multiple gesture attributes, each of which may be one recognition task. These gesture attributes may comprise gesture location, gesture direction, gesture condition, and/or gesture force as described further below.

As one example, the user may use one or both hands to perform gestures at mobile computing device 100, which may include gestures performed at display device 102 and/or off-screen gestures that are not performed at display device 102. Off-screen gestures may include gestures that are performed at one or more portions (e.g., one or more back and/or side portions) of housing 103 of mobile computing device 100.

For instance, in the example of FIG. 1A, the user may use a right hand 113 to perform one or more gestures at mobile computing 100. Right hand 113 includes fingers 115, 116, 117, 118, and 119. As indicated in FIG. 1A, right hand 113 of the user is holding mobile computing device 100. Thumb finger 115 is in contact with one or more right-side portions of housing 103, and fingers 117, 118, 119 are in contact with one or more left-side portions of housing 103. In addition, index finger 116 is in contact with one or more back portions 101 of housing 103, as indicated in FIG. 1A. Back portions 101 may comprise one or more particular portions or areas included on a back or rear side of housing 103.

As will be described in more detail below, mobile computing device 100 may use gesture detection module 134 to identify, based on a first group of sensor signals provided by at least by an inertial measurement unit (IMU) included in sensors 104, at least one gesture that is performed at one or more portions of housing 103 that are separate from display device 102. For example, gesture detection module 134 may identify one or more back-tap gestures (e.g., a double back-tap gesture) performed by finger 116 of the user at one or more back portions 101 of housing 103, based on a group of sensor signals provided by the IMU included in sensors 104. In some cases, the IMU (e.g., IMU 233 shown in FIG. 2) may include any combination of one or more of a gyroscope, an accelerometer, and/or a magnetometer.

Responsive to gesture detection module 134 identifying the at least one gesture, mobile computing device 100 may use interaction mode selector 136 and/or interaction mode modules 138 to initiate an interaction mode. In some cases, each of interaction mode modules 138 may provide a respective interaction mode for interacting with the user during execution of applications 132. For example, as described in further detail below, and as also shown in FIG. 2, interaction mode modules 138 may include an accessibility mode module 240, an assistive mode module, an inertia mode module, and/or a background mode module.

One or more of interaction mode modules 138 may output, based on a second group of sensor signals provided by sensors 104, at least one visual or audio indicator for the interaction mode that is associated with a particular function of mobile computing device 100. For example, upon gesture detection module 134 identifying a double back-tap gesture, interaction module selector 136 may select an accessibility mode provided by interaction mode modules 138. The accessibility mode may provide audio and/or visual accessibility features while the user interacts with mobile computing device 100, such as with display device 102.

For instance, as shown in FIG. 1A, during such an accessibility mode, the user may use one or more fingers to explore the contents that are output at display device 102. FIG. 1A illustrates that mobile computing device 100 may use UI module 130 to output date (e.g., "Tuesday, May 5") and temperature (e.g., "60° F.") information at display device 102. UI module 130 may also output various graphical icons that are associated with different components or applications, such as applications 132. In FIG. 1A, four such graphical icons are displayed at display device 102, which correspond to four different applications (e.g., "App 1," "App 2," "App 3," and "App 4") that may be executed by mobile computing device 100.

Each of these four graphical icons may be displayed at a certain respective region of a graphical user interface (GUI) output at display device 102. For instance, the first icon associated with a first application ("App 1") may be displayed within region 108 of the GUI; the second icon associated with a second application ("App 2") may be displayed within region 110 of the GUI; the third icon associated with a third application ("App 3") may be displayed within region 112 of the GUI; and the fourth icon associated with a fourth application ("App 4") may be displayed within region 114 of the GUI.

As indicated above, during an accessibility mode, the user may use one or more fingers to explore the contents of the GUI that are output at display device 102. In some cases, interaction module modules 138 may output another graphical icon 106 indicating that mobile computing device 100 is currently operating in the accessibility mode. When display device 102 comprises a presence-sensitive display, the user (e.g., a visually impaired user) may use one or more fingers (e.g., one or more fingers of right hand 113 or the user's left hand) to perform one or more touch gestures (e.g., slide or movement gestures) at display device 102. Based on sensor signals provided by one or more of sensors 104 (e.g., one or more sensors identifying touch or presence of any fingers at one or more regions of the GUI output by display device 102), interaction modules 138 may output at least one visual or audio indicator for the interaction mode that is associated with a particular function of mobile computing device 100.

For instance, if the user uses a finger to touch or come into proximity with any location within region 108 of the GUI output at display device 102, interaction mode modules 138 may output an audio indicator that is associated with the first application ("App 1"). As one example, interaction mode modules 138 may output (e.g., at a speaker device of mobile computing device 100) audio speech output specifying the phrase "App 1" to audibly identify the name of this first application (e.g., an email application). The audio speech that is output indicates the content that is displayed at region 108 of the graphical user interface at which the gesture is performed. As a result, the user may be able to hear the name of this first application as the user's finger touches region 108.

As shown in FIG. 1B, if the user continues to move the user's finger into a location within region 114, interaction mode modules 138 may provide audio speech output specifying the phrase "App 4" to audibly identify the name of this second application (e.g., a calculator application). As shown in the example of FIG. 1B, the user may move finger 115 of right hand 113 into region 114, although in other examples, the users may move any other finger of right hand 113 or any finger of the user's left hand into region 114. In such fashion, the user is able to navigate one or more fingers across the GUI output at display device to hear, e.g., the corresponding names of identifiers of applications that are associated with regions of the GUI at which the user's finger(s) are currently located.

In certain examples, either in addition to or in lieu of providing one or more audio indicators of the information associated with regions 108, 110, 112, 114 as described above, interaction mode modules 138 may output one or more visual indicators for the interaction mode (e.g., accessibility mode) as display device 102. For example, continuing with the example above in which the user has moved finger 115 into region 114 associated with the fourth application ("App 4"), in addition to providing speech output specifying the phrase "App 4," interaction mode modules 138 may also provide a visual indicator associated with "App 4" for region 114, such as by providing a visual magnification of the graphical icon for "App 4" included in region 114 (e.g., for a visually impaired user), such as shown in FIG. 1C. FIG. 1C illustrates such a visual magnification of this content that is included within the magnifier icon 121, which may be content displayed in region 114 at which the current touch gesture is performed by finger 115.

If user wishes to further explore the information output at display device 102 (e.g., the information included in regions 108, 110, and/or 112), the user may move finger 115 at display device 102 to receive a visual and/or audio indicator of the content included in any of these regions as finger 115 moves from region to region. In this case, magnifier icon 121 illustrated in FIG. 1C may also visually move within the GUI to selectively magnify content in these regions as finger 115 is moved. In certain cases, interaction mode modules 138 may only output one or more visual indicators, such as shown in FIG. 1C, as finger 115 moves from region to region, without necessarily outputting audio indicators (e.g., speech words or phrases). In such fashion, interaction mode modules 138 may provide visual and/or audio indicators in response to user navigation of one or more fingers across the content output at display device 102.

Responsive to such navigation, the user may also be capable of selecting any of the graphical icons included within respective regions of the GUI. For example, if the user's finger is located at region 114, the user may be able to perform one or more gestures to select the graphical icon for "App 4," such as by performing, e.g., a single back-tap gesture at portion 101 of housing 103 using finger 116.

Gesture detection module 134 may identify, based on a further group of sensor signals provided by sensors 104, this at least one second gesture that is performed at the one or more portions of housing 103 to confirm a user selection of a particular function, such as the execution of the fourth application associated with region 114. Responsive to identifying the at least one second gesture, mobile computing device 100 may perform a corresponding function (e.g., execute the fourth application from applications 132). Thus, upon initiating such an interaction mode, mobile computing device 100 may be configured to perform one or more functions based on one or more detected on-screen and/or off-screen gestures. Off-screen interaction may, in various cases, enable one-handed and/or eyes-free mobile interaction. Upon gesture detection module 134 identifying a further gesture (e.g., another back-tap gesture) performed at one or more portions of housing 103, based on detection of one or more further sensor signals provided by sensors 104 indicating a user intent to exit the current interaction mode, interaction mode modules 138 may exit this interaction mode.

FIG. 2 is a block diagram illustrating an example mobile computing device 200, in accordance with one or more aspects of the present disclosure. Mobile computing device 200 may comprise one example of mobile computing device 100 illustrated in FIGS. 1A-1C, where similarly numbered components may provide similar functions to those described in reference to FIGS. 1A-1C. FIG. 2 illustrates only one particular example of mobile computing device 200, and many other examples of mobile computing device 200 may be used in other instances and may include a subset of the components included in example mobile computing device 200 or may include additional components not shown in FIG. 2.

In the example of FIG. 2, mobile computing device 200 has a housing 203 and includes presence-sensitive display device 202, one or more processors 220, one or more input components 222, one or more communication units 224, one or more output components 226, one or more sensors 204, a power source 228, and one or more storage devices 250. Communication channels 227 may interconnect each of the components 220, 222, 202, 224, 204, 228, 226, and/or 250 for inter-component communications (physically, communicatively, and/or operatively). In some examples, communication channels 227 may include a system bus, a network connection, an inter-process communication data structure, or any other method for communicating data between hardware and/or software.

One or more input components 222 of mobile computing device 200 may receive input, such as input from a user. Examples of input are touch/tactile, presence-sensitive, and audio input. Examples of input components 222 include a presence-sensitive screen, touch-sensitive screen, touchscreen, mouse, keyboard, trackpad, voice responsive system, video camera, microphone or any other type of device for detecting input from a human or machine.

One or more output components 226 of mobile computing device 200 may generate output. Examples of output are haptic, audio, and visual output. Examples of output components 226 include a presence-sensitive screen, a touch-sensitive screen, a touchscreen, a sound card, a video graphics adapter card, a speaker, a liquid crystal display (LCD), an organic light-emitting diode (OLED) display, a micro light-emitting diode (microLED) display, an active matrix organic light-emitting diode (AMOLED) display, a haptic device, or any other type of device for generating output to a human or machine.

One or more communication units 224 of mobile computing device 200 may communicate with external devices via one or more networks by transmitting and/or receiving network signals on the one or more networks (e.g., one or more wired and/or wireless networks). For example, mobile computing device 200 may use communication units 224 to transmit and/or receive radio signals on a radio network such as a cellular radio network. Likewise, communication units 224 may transmit and/or receive satellite signals on a satellite network such as a global positioning system (GPS) network. Examples of communication units 224 include a network interface card (e.g. such as an Ethernet card), an optical transceiver, a radio frequency transceiver, a GPS receiver, or any other type of device that can send and/or receive information. Other examples of communication units 224 may include short wave radios, cellular data radios, wireless Ethernet network radios, as well as universal serial bus (USB) controllers.

Presence-sensitive display device 202 of mobile computing device 200 includes display component 223 and presence-sensitive input component 225. In some examples, presence-sensitive display device 202 may provide output to a user using haptic, audio, or visual stimuli as described above with reference to output components 226. For example, display component 223 may provide display or video output as described with reference to output components 226. Presence-sensitive display device 202 may also provide input capabilities such as that described above with reference to input components 222. For example, presence-sensitive input component 225 may provide input capabilities as described with reference to input components 222.

Display component 223 may be a screen at which information is displayed by presence-sensitive display device 202, and presence-sensitive input component 225 may detect an object at and/or near display component 223. As one example range, presence-sensitive input component 225 may detect an object, such as a finger or stylus that is within two inches or less of display component 223. Presence-sensitive input component 225 may determine a location (e.g., an (x,y) coordinate) of display component 223 at which the object was detected. In another example range, presence-sensitive input component 225 may detect an object six inches or less from display component 223 and other ranges are also possible. Presence-sensitive input component 225 may determine the location of display component 223 selected by a user's finger using capacitive, inductive, radar-based, and/or optical recognition techniques. In some examples, presence-sensitive input component 225 also provides output to a user using touch, presence-sensitive, audio, or video stimuli as described with respect to display component 223. Display component 223 may be any type of output device that provides visual output, such as described with respect to output components 226.

While illustrated as an internal component of mobile computing device 200, presence-sensitive display device 202 may also represent an external component that shares a data path with mobile computing device 200 for transmitting and/or receiving input and output. For instance, in one example, presence-sensitive display device 202 represents a built-in component of mobile computing device 200 located within and physically connected to the external packaging of mobile computing device 200 (e.g., a screen on a mobile phone). In another example, presence-sensitive display device 202 represents an external component of mobile computing device 200 located outside and physically separated from the packaging of mobile computing device 200 (e.g., a monitor and/or a projector that shares a wired and/or wireless data path with a tablet computer).

Presence-sensitive display device 202 of mobile computing device 200 may detect two-dimensional and/or three-dimensional gestures as input from a user of mobile computing device 200. For instance, a sensor of presence-sensitive display device 202 (e.g., sensor of presence-sensitive input component 225) may detect a user's movement (e.g., moving a hand, an arm, a pen, a stylus) within a threshold distance of the sensor of presence-sensitive display device 202. Presence-sensitive display device 202 may determine a two- or three-dimensional vector representation of the movement and correlate the vector representation to a gesture input (e.g., a hand-wave, a pinch, a clap, a pen stroke) that has multiple dimensions. In other words, presence-sensitive display device 202 can detect a multi-dimensional gesture without requiring the user to gesture at or near a screen or surface (e.g., display component 223) at which presence-sensitive display device 202 outputs information for display. Instead, presence-sensitive display device 202 can detect a multi-dimensional gesture performed at or near a sensor which may or may not be located near the screen or surface at which presence-sensitive display device 202 outputs information for display.

One or more storage devices 250 within mobile computing device 200 may store information for processing during operation of mobile computing device 200 (e.g., during execution of one or more of UI module 230, applications 232, operating system 254, or gesture detection module 234). In some examples, storage devices 250 include temporary memory, meaning that a primary purpose of storage devices 250 is not long-term storage. Storage devices 250 on mobile computing device 200 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 250, in some examples, include one or more computer-readable storage media. Storage devices 250 may be configured to store larger amounts of information than volatile memory. Storage devices 250 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 250 may store program instructions and/or data associated with one or more applications 232, UI module 230, operating system 231, gesture detection module 234, interaction mode selector 236, and interaction mode modules 238. UI module 230, applications 232, gesture detection module 234, interaction mode selector 236, and interaction mode modules 238 may comprise examples of corresponding UI module 130, applications 132, gesture detection module 134, interaction mode selector 136, and interaction mode modules 138 shown in FIG. 1.

In certain examples, storage devices 250, or one or more of components included in storage devices 250, may be stored on one or more remote computing devices that are external to mobile computing device 200 (e.g., on one or more external servers). In some examples, one or more remote computing devices may store and/or execute UI module 230, applications 232, and/or operating system 231. In these examples, the one or more remote computing devices may perform functionality similar to that described herein in reference to processors 220.

As shown in FIG. 2, mobile computing device 200 may include a power source 228. In some examples, power source 228 may be a battery. Power source 228 may provide power to one or more components of computing device 2. Non-limiting examples of power source 228 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 228 may have a limited capacity (e.g., 1000-3000 mAh).

Mobile computing device 200 also includes one or more sensors 204. In some examples, one or more of sensors 204 may be examples of one or more of input components 222 and/or presence-sensitive input component 225. Sensors 204 include an inertial measurement unit (IMU) 233. For example, IMU 233 may include one or more gyroscopes, such as one or more high-frequency gyroscopes (e.g., a 200 Hz gyroscope), accelerometers, and/or magnetometers. As described herein, sensors 204 of mobile computing device 200 may be configured to determine a real-time orientation, rotation, or other movement of mobile computing device 200 in three-dimensional space.

One or more processors 220 may implement functionality and/or execute instructions within mobile computing device 200. For example, processors 220 on mobile computing device 200 may receive and execute instructions stored by storage devices 250 that execute the functionality of applications 232, operating system 231, UI module 230, interaction mode selector 236, gesture detection module 234, and/or interaction mode modules 238. These instructions executed by processors 220 may cause mobile computing device 200 to store information within storage devices 250 during program execution. Processors 220 may execute instructions of operating system 231 and applications 232 to perform one or more operations. That is, operating system 231 and applications 232 may be operable by processors 220 to perform various functions described herein.

In some alternate examples, mobile computing device 200 may only comprise or otherwise include processors 220. In these examples, input components 222, presence-sensitive display device 202, communication units 224, output components 226, sensors 204, power source 228, and storage devices 250 may be external to, yet communicatively coupled with (e.g., via communication channels 227), mobile computing device 200.

Applications 232 may include one or more different various applications. An e-mail application, a camera application, a map or navigation application, a calendar application, a messaging application, a social media application, a travel application, a game application, a stock application, and a weather application are all examples of applications 232.

Figure 3:
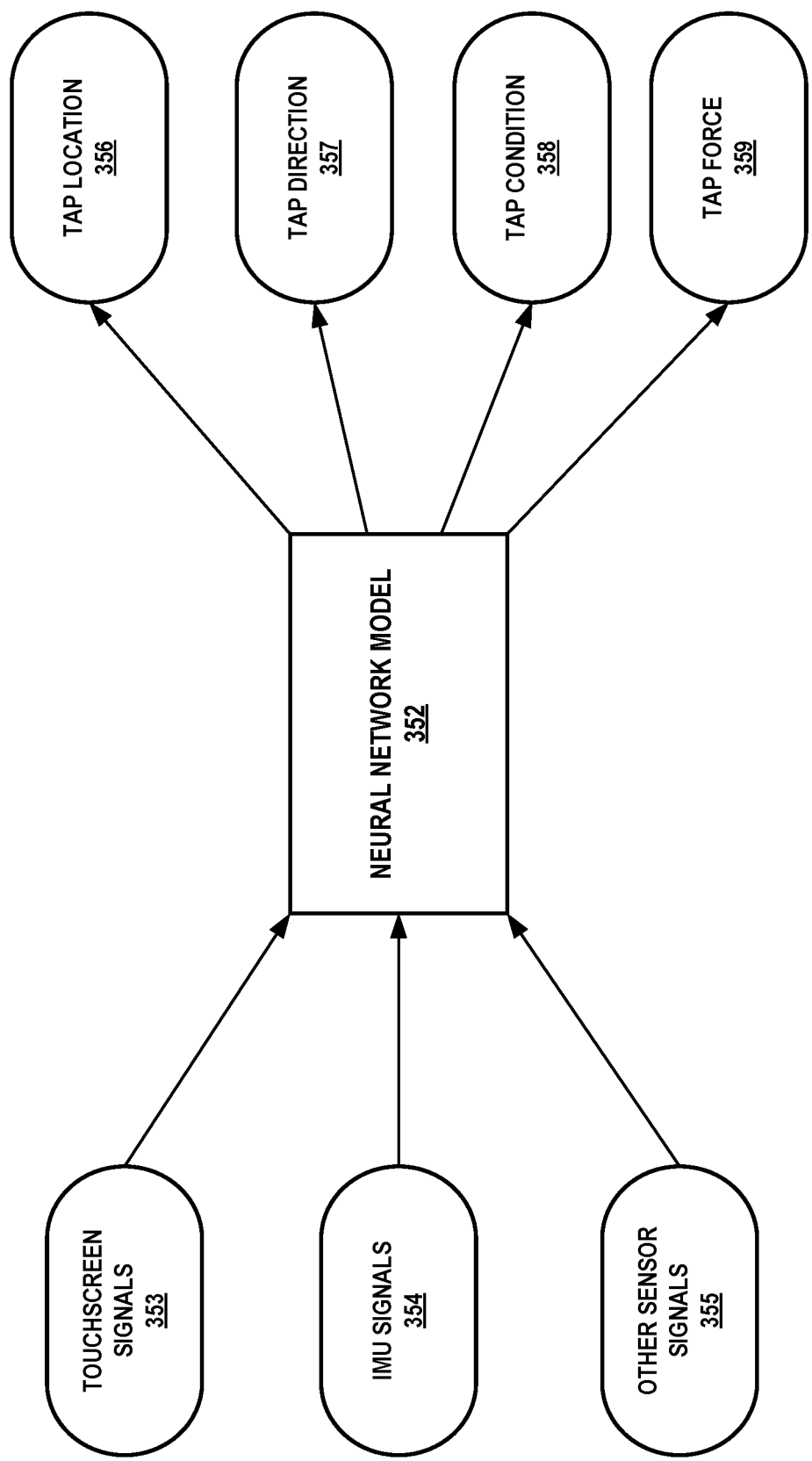
FIG. 3 is a block diagram illustrating an example use of a neural network model to identify gesture attributes, in accordance with one or more aspects of the present disclosure.

As shown in FIG. 2, gesture detection module 234 includes a machine learning module 229. Based on input provided by sensors 204, gesture detection module 234 may, in various examples and as described in further detail below, use a multi-input, multi-output convolutional neural network model, such as shown in FIG. 3, for off-screen gesture (e.g., tap) recognition. This detection method enables prediction of multiple gesture attributes. Machine learning module 229 may be configured to perform such prediction.

For example, machine learning module 229 may utilize a convolutional neural network to recognize signals provided by sensors 204, such as inertial measurement unit 233. For instance, in certain examples, each time a user taps on housing 203 of mobile computing device 200, the tap-induced motion signals from inertial measurement unit 233 may be captured and used by machine learning module 229 to recognize the tap location, direction (e.g., front, back, and four edges), condition (e.g., tapping using fingernail versus finger pad), and/or force applied. Similarly, machine learning module 229 may also classify inertial measurement unit signals each time the user tilts mobile computing device 200.

This neural network model takes the touch location information from the touchscreen if any (e.g., presence-sensitive input component 225), as well as a barometer and IMU signals to jointly estimate the tap location (x, y), direction (front/back/four sides), condition (finger pad vs nail), and/or force. If the estimated tap force is strong enough, it will be considered as a potential intentional tap. Note that the barometer values can be useful, as a strong tap would deform the phone housing, compress the air pressure inside, and thus affect the barometer reading.

FIG. 3 is a block diagram illustrating one such example use of a neural network model 352 to identify gesture attributes, in accordance with one or more aspects of the present disclosure. In this example, machine learning module 229 illustrated in FIG. 2 may utilize neural network model 352 to classify and/or determine gesture attributes, such as tap attributes, based upon analyzing sensor signals provided by sensors 204. In some cases, machine learning module 229 may be executed by an embedded digital processor unit included in processors 220.

In some cases, machine learning module 229 may utilize a light-weight convolutional neural network model and may be executed using, e.g., an embedded digital processor unit (e.g., one of processors 220) in a low power mode. In various examples, only when gesture detection module 234 detects a particular gesture (e.g., a double tap) at housing 203 will a more computationally intensive network will be activated and executed by, e.g., a main central processing unit of processors 220 to yield different tap attributes, such as location and direction. By doing so, gesture detection module 234 can potentially limit the false triggering cases (e.g., unintentional interaction with visual wallpaper output for display at display device 202) and maximally reduce power consumption of mobile computing device 200.

As shown in FIG. 3, neural network model 352 may receive various different signal inputs from sensors 204, such as one or more touchscreen signals 353 (e.g., signals associated with presence-sensitive input component 225), one or more inertial measurement unit signals 354 provided by inertial measurement unit 233, and one or more other optional sensor signals 355 (e.g., signals from a barometer if included in sensors 204). By processing these input signals 353, 354, 355 as input, neural network model 352 of machine learning module 229 may predict or identify various gesture attributes, such as a tap location 356 associated with the gesture, a tap direction 357 associated with the gesture, a tap condition 358 associated with the gesture, and/or a tap force 359 associated with the gesture.

Tap location 356 may indicate or identify a predicted location of a tap event on a portion of housing 203 of mobile computing device 200, such as an (x, y) location or an area. Tap location 356 may be located on any portion of housing 203 or at presence-sensitive display device 202. Tap direction 357 may indicate or identify a predicted direction (e.g., front portions of housing 203, back portions of housing 203, right-edge/side portions of housing 203, left-edge/side portions of housing 203, top-edge/side portions of housing 203, bottom-edge/side portions of housing 203). Tap condition 358 may identify or indicate one or more conditions of the tap, such as whether the tap is performed with a nail or pad of a finger), and tap force 359 may indicate or identify an amount of force applied by the tap. In some cases, if the estimated tap force is strong enough, machine learning module 229 may consider the tap as an intentional tap, rather than an accidental tap.

Interaction mode modules 238 of FIG. 2 include various different modules that may be selected by interaction mode selector 236 based on the gesture that is identified by gesture detection module 234. In certain examples, one or more of interaction mode modules 238 may be included or executed by operating system 231. For example, interaction mode modules 238 include accessibility mode module 240, assistive mode module 241, inertia mode module 242, and background mode module 243. In various examples, gesture detection module 234 may identify a (e.g., predefined) particular gesture, such as a double back-tap gesture, that may cause interaction mode selector 236 to select a particular interaction mode. This particular gesture may be any form of gesture, such as a double back-tap gesture, a single back-tap gesture, an edge gesture performed on a side portion (e.g., right-side portion) of housing 203 and/or a portion of display device 202, and the like. In some cases, mobile computing device 200 may enable a user customization of the particular gesture that may be used to cause interaction mode selector 236 to select an interaction mode.

Upon gesture detection module 234 identifying the particular gesture, interaction mode selector 236 may select an interaction corresponding to one of interaction mode modules 238. Interaction mode selector 236 may make such selection based on one or more factors (e.g., the current operating state of mobile computing device 200, the current application(s) of applications 232 currently being executed, an identification by gesture detection module 234 of one or more prior and/or subsequent gestures, a detection of other sensors signals provided by sensors 204, other input and/or output detected by UI module 230). Interaction mode selector 236 and/or operating system 231 may then execute one of accessibility mode module 240, assistive mode module 241, inertia mode module 242, or background mode module 243 based on the selected interaction mode.

As described earlier in reference to FIGS. 1A-1C, an accessibility mode provided by accessibility mode module 240 may provide audio and/or visual accessibility features while the user interacts with mobile computing device 200, such as with display device 102. For instance, during such an accessibility mode, the user may use one or more fingers to explore the contents output at display device 202. Rather than relying solely on on-screen touch events, accessibility mode module 240 also processes off-screen gestures that are identified by gesture detection module 234.

The sole use of on-screen touch events for accessibility functions may result in certain limitations. For instance, object selection with a voice accessibility mode that uses only on-screen touch events may be performed with an on-screen tap gesture and/or an on-screen drag/swipe gesture. This paradigm of on-screen accessibility gestures, however, may lead to the break of the touch exploration continuity (e.g., the finger-surface contact). Exploration continuity is a common behavior with respect to tactile reading or how individuals with visual impairments may use sense and touch to perceive the world.

In addition, when users activate a voice accessibility mode that uses only on-screen touch events, these users may no longer be able use a conventional gesture navigation system, which is designed for straightforward use. Instead, voice accessibility users may have to develop a more complicated set of system navigation gestures that may involve multi-touch gestures or gesture combinations such as swipe up then down, which may considerably increase the difficulty of usage. While these limitations may present a learning hurdle for the long-term users, they may also prevent new users who can benefit from frequent and temporary access to voice accessibility and support features from using such an accessibility mode at all.

Thus, according to the presently disclosed techniques, accessibility mode module 240 may further utilize off-screen gestures that are identified by gesture detection module 234 and enable users to continue to use the more typically on-screen system navigation gestures while operating in the accessibility mode. In contrast to developing a new set of navigation gestures, the execution and use of accessibility mode module 240 (e.g., using off-screen gestures such as back-tap gestures) enables accessibility users to continue to use the conventional system navigation gestures during navigation and exploration of items within a displayed GUI. As a result, exploration continuity may be maintained.

According to the presently disclosed techniques, accessibility mode module 240 may provide an explorative gesture (e.g., explorative tap) technique enabling users to perform off-screen gestures to quickly invoke and utilize a voice and/or visual accessibility mode. For example, in various cases, accessibility mode module 240 may process a back-of-device tapping gesture (e.g., double back-tap gesture on one or more back portions of mobile computing device 200), identified by gesture detection module 234, to initiate quick access to the voice and/or visual accessibility features of the accessibility mode. To achieve the goals of quick access and exploration continuity, accessibility mode module 240 utilizes, in various examples, back-of-device gesture (e.g., tap) detection to empower users to invoke and exit the accessibility mode on the fly during interactions, and may, in certain cases, mimic the tactile reading behavior in a two-handed interaction paradigm.

In this mode, users can use a touch exploration finger (e.g., finger 115 shown in FIG. 1B) to explore and glide over the screen for touch exploration to cause accessibility mode module 240 to output, e.g., audible speech corresponding to the navigated on-screen content. During this touch exploration period, users can perform, e.g., a single back tap gesture on a back portion of housing 203 to confirm selection of the spoken object. Users can lift the touch exploration finger to exit the accessibility mode, and then use typical on-screen, finger-based gestures for further system navigation. This approach therefore saves the new voice accessibility users from learning a complicated set of new system navigation gestures, but instead allows users to use separate off-screen gestures to perform certain tasks during the accessibility mode.

For instance, a user can perform a double-tap gesture on a back portion of housing 203 to invoke the accessibility mode provided by accessibility mode module 240. The user may then drag a touch exploration finger (e.g., finger 115 in FIG. 1B) over the GUI output at display device 202 to hear audio support and/or view visual support (e.g., magnification) of the on-screen displayed objects, based on accessibility mode module 240 identifying, e.g., touch gestures at display device 202 based on one or more groups or received sensor signals from sensors 204 and/or input component 225. The user may then perform a single-tap gesture on the back portion of housing 203 to perform selection of the corresponding touch object. This type of interaction means that the user can keep the touch exploration finger over the screen throughout the phase of the accessibility mode, providing exploration continuity and mimicking the effect of tactile reading behaviors. To select an on-screen object during the touch exploration, the user can keep the touch exploration finger hovering over the object and perform, e.g., a single back-tap gesture on a back portion of housing 203 to select the object, using, e.g., the hand that is holding mobile computing device 200, such as hand 113 shown in FIG. 1A. This continuity may also reduce the interaction efforts by using a single back-tap gesture for object selection, which can potentially be a great benefit for the cases when frequent object selection is used, such as typing using a virtual on-screen keyboard. After one phase of interaction, if the user wants to exit the accessibility mode, the user can lift the touch exploration finger from display device 202 to exit the accessibility mode, and then use the traditional on-screen gesture navigation system to perform further operations at display device 202.

As one example, UI module 230 may output various graphical icons, links, and/or other information that are associated with different components or applications, such as applications 232. In FIG. 1A, four such graphical icons are displayed that correspond to four different applications (e.g., "App 1," "App 2," "App 3," and "App 4") that may be executed. In other examples, display component 223 may display any form of other graphical information or icons, such as hypertext or web links, text or symbols, components (e.g., keys) of a graphical keyboard, and the like, where the web links may be associated with one or more websites that can be accessed by mobile computing device 200, and/or where the keys of a graphical keyboard may be selected by mobile computing device 200, during performance of one or more functions by interaction mode modules 238.

The information displayed using display component 223 may have associated locations or regions of display at presence-sensitive display device 202. For example, in the example of FIG. 1A, each of these four graphical icons may be displayed at a certain respective region of a GUI: a first icon associated with a first application ("App 1") may be displayed within region 108 of the GUI; the second icon associated with a second application ("App 2") may be displayed within region 110 of the GUI; the third icon associated with a third application ("App 3") may be displayed within region 112 of the GUI; and the fourth icon associated with a fourth application ("App 4") may be displayed within region 114 of the GUI.

During execution of accessibility mode module 240, a user may use one or more fingers to explore the contents of the GUI that are output at display device 202. For example, the user (e.g., a visually impaired user) may use one or more fingers (e.g., one or more fingers of right hand 113 or the user's left hand) to perform one or more touch gestures (e.g., slide or movement gestures) at display device 202. Based on sensor signals provided by one or more of sensors 204 (e.g., one or more sensors identifying touch or presence of any fingers at one or more regions of the GUI output by display device 202), interaction modules 138 may output at least one visual or audio indicator for the interaction mode that is associated with a particular function of mobile computing device 200.

For instance, if the user uses a finger to touch or come into proximity with any location within region 108 of the GUI, accessibility mode module 240 may output an audio indicator that is associated with the first application ("App 1"). As one example, accessibility mode module 240 may provide speech output, specifying the phrase "App 1," to audibly identify the name of this first application (e.g., an email application). As a result, the user may be able to hear the name of this first application as the user's finger touches region 108. If the user continues to move the user's finger into a location within another region (e.g., region 114), accessibility mode module 240 may provide speech output to audibly identify the name of this second application (e.g., a calculator application). The user may move a finger of either the user's right or left hand when navigating the displayed information on display device 202 to hear, e.g., the corresponding names of identifiers of applications that are associated with regions of the GUI at which the user's finger(s) are currently located.

As also described earlier in reference to FIG. 1C, in certain examples, either in addition to or in lieu of providing one or more audio indicators of the information that is displayed, accessibility mode module 240 may output one or more visual indicators for the interaction mode (e.g., accessibility mode) as display device 202. For example, continuing with the example above in which the user may move finger 115 into region 114 associated with the fourth application ("App 4"), in addition to providing speech output specifying the phrase "App 4," accessibility mode module 240 may also provide a visual indicator associated with "App 4" for region 114, such as by providing a visual magnification of the graphical icon for "App 4" included in region 114 (e.g., for a visually impaired user), such as shown in FIG. 1C. In this case, magnifier icon 121 illustrated in FIG. 1C may also visually move within the GUI to selectively magnify content in these regions as finger 115 is moved. In such fashion, accessibility mode module 240 may provide visual and/or audio indicators in response to user navigation of one or more fingers across the content output at display device 202.

Responsive to such navigation, the user may also be capable of selecting any of the graphical icons included within respective regions of the GUI. For example, if the user's finger is located at region 114, the user may be able to perform one or more gestures to select the graphical icon for "App 4," such as by performing, e.g., a single back-tap gesture at a back portion of housing 203. Gesture detection module 234 may identify, based on another group of sensor signals provided by sensors 204, this at least one second gesture that is performed at the one or more portions of housing 203 to confirm a user selection of a particular function, such as the execution of the fourth application associated with region 114.

Responsive to identifying the at least one second gesture, mobile computing device 200 may perform a corresponding function (e.g., execute the fourth application from applications 232). In such fashion, accessibility mode module 240 may provide an intuitive user experience for voice and/or visual accessibility modes using, e.g., back-of-device tap detection. Off-screen tap interaction opens a myriad of new opportunities for voice and/or visual accessibility support. It empowers users with the possibilities of quick access to the accessibility mode as well as the continuity in touch exploration, and thus may lead to better user experiences in the accessibility mode.

As shown in FIG. 2, interaction mode modules 238 also include an assistive mode module 241. In various examples, assistive mode module 241 may provide a tilt-and-back-tap assistive interface that enables a user to perform certain functions (e.g., scroll up, scroll down, switch applications) by using back-tap gestures on housing 203 of mobile computing device 200.

There may be a number of situations where one-handed interaction is preferable for in-situ mobile uses of mobile computing device 200 (e.g., when a user is holding a handrail in the subway or lying on bed). In addition, improved support for one-handed interaction may also be beneficial for users with disabilities.

Current touch-based interaction typically involves a user performing a thumb touch while holding mobile computing device 200 in a less natural grip gesture. The use of this gesture may make it harder for the user to grasp mobile computing device 200 firmly, and it may be particularly difficult to use this gesture if the user is holding mobile computing device 200 up in the air (e.g., while lying down). To address this issue, assistive mode module 241 provides an assistive execution mode that includes a tilt-and-back-tap interface, enabling users to perform mobile device interactions with a more natural phone grip gesture, such as shown in FIG. 4A.

Figure 4A:
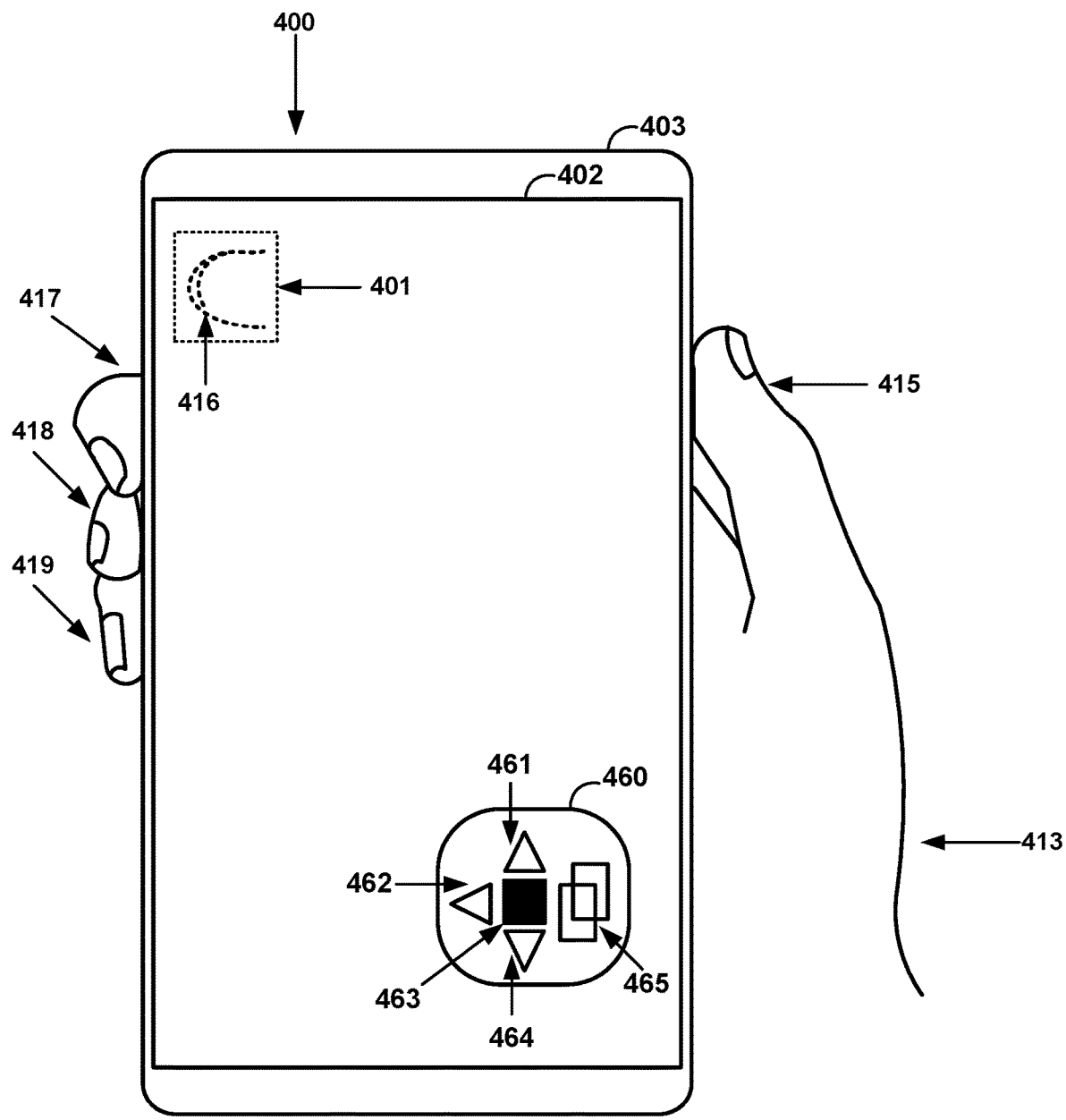
FIGS. 4A-4B are conceptual diagrams illustrating an example mobile computing device that is configured to initiate an assistive interaction mode, in accordance with one or more aspects of the present disclosure.
Figure 4B:
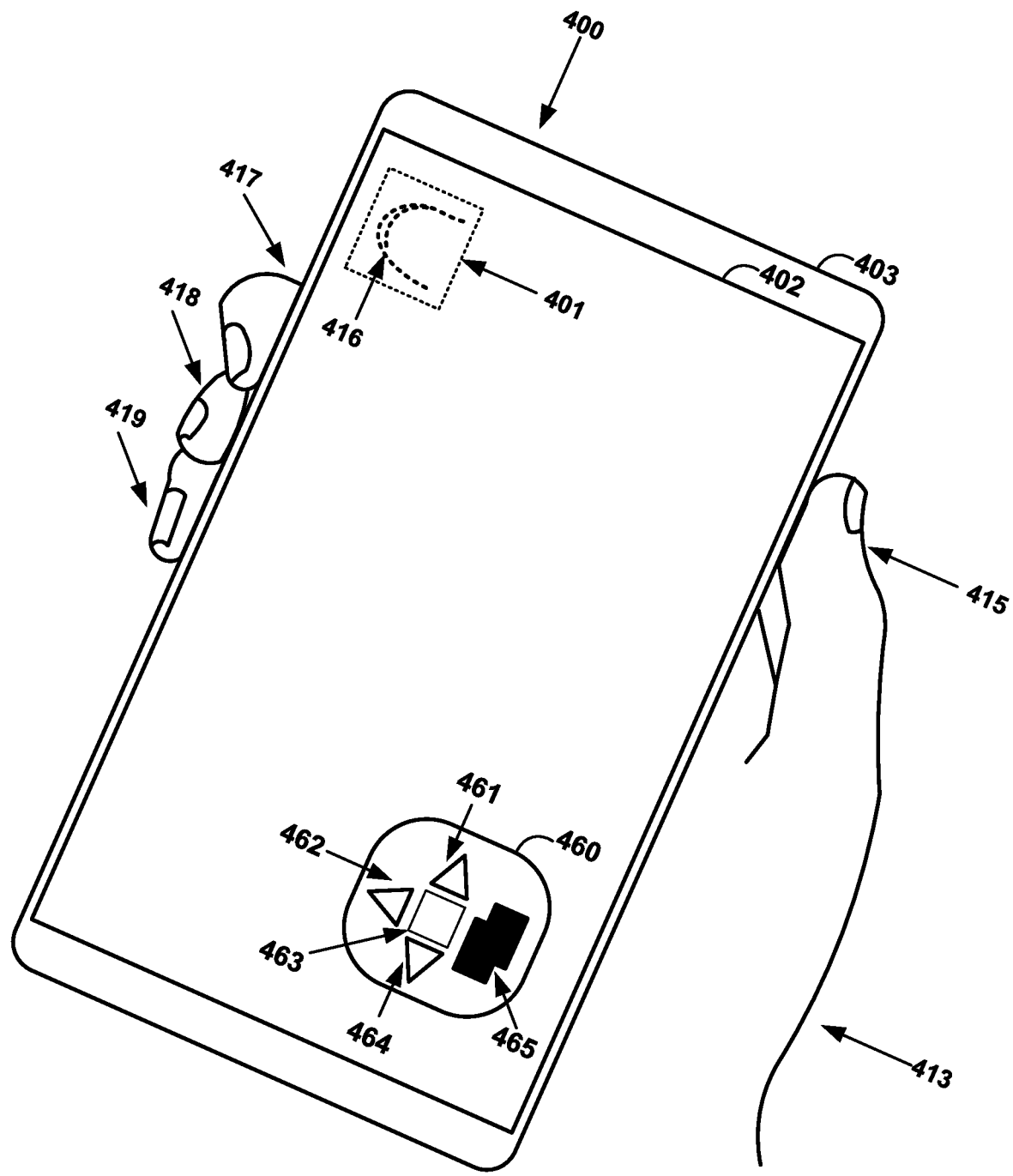

FIGS. 4A-4B are conceptual diagrams illustrating an example mobile computing device 400 that is configured to initiate an assistive interaction mode, such as during execution of assistive mode module 241, in accordance with one or more aspects of the present disclosure. In FIGS. 4A-4B, mobile computing device 400 may be one example of mobile computing device 200 (FIG. 2) and/or mobile computing device 100 (FIGS. 1A-1C). Housing 403 may be one example of housing 203 and/or housing 103. Display device 402 may be one example of display device 202 and/or display device 102.

Similar to initiating the accessibility mode, a user may initiate the assistive mode provided by assistive mode module 241 (FIG. 2) by performing, e.g., a double back-tap gesture. For example, the user may use pointer finger 416 of hand 413 to perform a double back-tap gesture at back portions 401 of housing 403. Gesture detection module 234 may identify the gesture based on one or more group of sensor signals provided by sensors 204 (e.g., IMU sensor signals provided by IMU 233). Other fingers 415, 417, 418, and 419 may hold mobile computing device 400.

As illustrated in FIG. 4A, after finger 416 performs the double back-tap gesture, interaction mode selector 236 may initiate assistive mode module 241. Assistive mode module 241 may output visual menu 460 at display device 402. Menu 460 provides a visual indicator of various different functions that may be performed by assistive mode module 241 during the assistive mode that are associated with different menu items. For example, menu 460 may include menu items 461, 462, 464, 465. Menu item 461 may comprise a graphical up arrow associated with a scroll up function, while menu item 464 may comprise a graphical down arrow associated with a scroll down function. Menu item 462 may comprise a graphical left arrow associated with a page back/backwards function, and menu item 465 may comprise a graphical icon associated with a function to toggle or switch between different applications 132 that may be executed. As a result, each of menu items 461, 462, 464, 465 comprises a visual indicator of a respective function that may be performed by assistive mode module 241.

Assistive mode module 241 and/or gesture detection module 234 may be configured to recognize tilting and back tap gestures from motion signals provided by sensors 204. After the user has performed an initial back-tap gesture using finger 416 at one or more back portions 401 of housing 403 to initiate the assistive interaction mode provided by assistive mode module 241, the user can subsequently tilt mobile computing device 400 using one or more tilt gestures to select a menu item of menu 460, where the one or more tilt gestures are associated with a detected movement and/or rotation of mobile computing device 400 (e.g., based on sensor signals provided by sensors 204). The user may then perform another (e.g., single) back tap gesture at one or more back portions 401 to perform the function associated with the selected menu item, based on one or more groups of sensors signals provided by sensors 204 (e.g., IMU sensor signals provided by IMU 233) that are used by gesture detection module 234 to identify these gestures.

Assistive mode module 241 provides an interface, such as shown in FIGS. 4A-4B, which enables users to perform the commonly used system navigation functions (e.g., scroll functions, page back function, switch application function) by way of tilting and back-tap gestures, which allows users to hold mobile computing device 400 in a natural grip gesture and provide one-handed interactions.

As shown in FIG. 4A, prior to the user performing a tilt gesture, and after assistive mode module 241 has initially entered the assistive interaction mode, no menu items have yet been selected. As a result, the menu center icon 463 is highlighted, shaded, or otherwise prominently displayed, indicating that none of menu items 461, 462, 464, or 465 have yet been selected, as indicated in FIG. 4B.

However, after the assistive mode is initiated, the user may use hand 413 to perform one or more tilt gestures to cause mobile computing device 400 to move and/or rotate in one or more directions or orientations. One or more of sensors 204 (e.g., IMU 233) may provide sensor signals indicative of the movement and/or rotation, and gesture detection module 234 may process these signals to identify one or more tilt gestures. For example, the user may tilt mobile computing device 400 up, down, to the right, to the left, in a clockwise manner, in a counterclockwise manner, or any combination thereof. Gesture detection module 234 may provide an indication of the identified tilt gesture, as well as corresponding attributes of the tilt gesture, to assistive mode module 241, which may indicate at least one of a direction or an orientation of the detected movement or rotation of mobile computing device 400.

Assistive mode module 241 may then identify which menu item of menu 460 to select based on the attributes of the tilt gesture, which are associated with the at least one of the direction or the orientation of the detected movement or rotation of mobile computing device 400. For instance, assistive mode module 241 may define a mapping of gesture attributes to selected menu items. As one example, assistive mode module 241 may select menu item 461 in response to a tilt gesture that tilts mobile computing device 400 up, relative to the top of mobile computing device 400 in view of its current position and/or orientation. Similarly, assistive mode module 241 may select menu item 464 in response to a tilt gesture that tilts mobile computing device 400 down. Assistive mode module 241 may select menu item 462 in response to a tilt gesture that tilts mobile computing device 400 to the left, and it may select menu item 465 in response to a tilt gesture that tilts mobile computing device to the right.

Alternatively, as indicated in the example of FIG. 4B, assistive mode module 241 may select menu item 462 in response to a tilt gesture that tilts mobile computing device 400 in a counterclockwise manner (relative to a current position and/or orientation of mobile computing device 400), and may select menu item 465 in response to a tilt gesture that tilts mobile computing device 400 in a clockwise manner. In such fashion, assistive mode module 241 may output one or more visual indicators via the respective menu items of menu 460 for the assistive interaction mode, where each menu item is associated with a corresponding function, as further described below.

In FIG. 4B, the user has used hand 413 to tilt mobile computing device in a clockwise manner, relative to the position and/or orientation of mobile computing device 400 shown in FIG. 4A. As a result of gesture detection module 234 detecting the attributes of this tilt gesture, and providing this information to assistive mode module 241, assistive mode module 241 selects menu item 465 of menu 460. As shown in FIG. 4B, assistive mode module 241 shades, highlights, or otherwise prominently displays menu item 465, relative to the other menu items 461, 462, 464, to provide a visual indicator to the user that menu item 465 is selected, where menu item 465 is associated with a particular function (e.g., switch application function).

To confirm the displayed selection of menu item 465, the user may use finger 416 to perform a single back-tap gesture at one or more back portions 401 of housing 403. Upon receiving an indication of the back-tap gesture from gesture detection module 234, which identifies this gesture based on one or more groups of sensor signals received from sensors 204, assistive mode module 241 may confirm the selection of menu item 465 and perform the corresponding function, such as performing an application-switch function to switch between applications 132 that are executed and/or displayed in the foreground of display device 402. The user may continue to perform back-tap gestures at one or more back portions 401 to perform further selections of the highlighted menu item (e.g., menu item 465). That is, the user may perform repeated back tap gestures while menu item 465 is highlighted, as indicated in FIG. 4B, to cause assistive mode module 241 to perform repeated functions associated with menu item 465 (e.g., repeated application switch functions).

In addition, the user may perform additional tilt gestures to select different menu items from menu 460. Thus, as one example, the user may tilt mobile computing device 400 up to select menu item 461, which may be then prominently displayed at display device 402 (rather than menu item 465), and may then perform one or more back tap gestures to confirm the selection of menu item 461, which causes assistive mode module to perform one or more corresponding scroll-up functions (e.g., while browsing web content). When the user is ready to exit the assistive interaction mode, the user may perform, e.g., a double back-tap gesture to cause assistive mode module 241 to exit this mode. In this case, the user may perform a double back-tap gesture to both initiate and exit the assistive interaction mode, and may perform tilt gestures in between to cause assistive mode module 241 to perform functions (e.g., system navigation or other functions) that correspond to selected menu items from menu 460.

In various examples, for implementation of assistive mode module 241 and machine learning module 229 of gesture detection module 234, machine learning module 229 may utilize a light-weight convolutional neural network model (e.g., neural network model 352) and may be executed using, e.g., an embedded digital processor unit (e.g., one of processors 220) in a low power mode. This model may classify tap direction and non-tap events from any tap-like signal indicated by sensors 204. If the interface of assistive mode module 241 has already been invoked, all the recognized back tap as well as the tilting gestures may be passed from gesture detection module 234 to assistive mode module 241 and/or operating system 231 to control the navigation functions and identify selected menu items of menu 460. If the interface of assistive mode module 241 has not yet been invoked, the signal processing service in digital processor unit and/or gesture detection module 234 may analyze the back tap timing, and only look for those gestures that fit the double tap pattern, in order to recognize intentional double back-tap gestures to initiate the assistive mode.

In various examples, tilt events can be detected by gesture detection module 234 using either a heuristic or a machine learning method from, e.g., the gyroscope data provided by sensors 204. In certain cases, users may also use a triple back tap gesture to invoke an on-screen cursor and use tilting to manipulate the cursor for navigation at display device 202.

Tilt-and-back-tap interaction opens a myriad of new opportunities. The use of such interaction may be easy and convenient, and may empower users with the possibility to perform one-handed interaction with the natural holding gesture of mobile computing device 400 illustrated in FIGS. 4A-4B, enabling interaction behaviors when users browse, e.g., news feeds or social networks.

Interaction mode modules 238 of FIG. 2 also include inertia mode module 242. Inertia mode module 242 may provide what is referred to herein as an inertia interaction mode. In various examples, during this interaction mode, inertia mode module 242 and/or gesture detection module 234 may estimate a tap force from IMU signals provided by IMU 233, and may also estimate tap location from output by machine learning module 229 based, e.g., on force and/or angle changes associated with a tap gesture. As a result, in certain cases, inertia mode module 242 and/or gesture detection module 234 may be configured to identify touch gestures at one or more portions of housing 203 and/or at display device 202 based on one or more groups of sensor signals from sensors 204 and/or input component 225, even when a finger is wearing gloves or has long fingernails, or even when there are water drops present on housing 203 or display device 202, potentially rejecting false touch events when there are water drops on the touchscreen affecting the sensing reliability.

Similar to using the touch pressure for unintentional touch rejection, inertia mode module 242 and/or gesture detection module 234 may exploit the inertia produced by an intentional tap, including the force generated by the tap gesture as well the orientation changes induced by the tap, where motion sensing can be used to discriminate the user's tap intention. These various attributes can be captured by or be determined based on signals from IMU 233 included in sensors 204. In various cases, machine learning module 229 may utilize a neural network model (e.g., neural network model 352 of FIG. 3) to determine one or more attributes of the tap gestures. The disclosed techniques do not rely on capacitive sensing, and therefore can work on waterfall screens or normal screens that do not cover the edge of devices. Display device 202 may therefore comprise a waterfall or a non-waterfall screen.

In certain cases, inertia mode module 242 may provide certain functionality related to side tap and swipe gestures that may provide an effective and ergonomic replacement for the use of edge buttons. Buttonless mobile computing devices (e.g., phones) have long been a design goal, and waterfall screens which are screens that are curved over the side edges of a device, have become a trend in phone design. Physical buttons, particularly volume control buttons, have been given various replacement solutions, but they are usually poor in usability. In addition, using a touch event alone on a visual edge button can lead to many false cases. The double touch gesture can be effective to reject accidental touch on a screen (e.g., at display device 202). However, this gesture involves multiple touch events, which increases the interaction difficulty and leads to a less intuitive user experience.

To address such difficulties and challenges, inertia mode module 242 provides functionality associated with a side impact action that generates an IMU response to prime the system into, e.g., a volume or other user-interface control state, which times out after a timeout period. Within and prior to expiration of the timeout period, inertia mode module 242 may map a swipe gesture at display device 202 to the volume or other variable user-interface control.

As a result, inertia mode module 242 provides a tap-and-swipe interaction paradigm. The swipe gesture that follows the side tap is also a confirmation of the user's intention. From an ergonomic perspective, users can use the index finger to tap on the edge to invoke an edge interface (e.g. a volume control interface), as shown in FIG. 5A-5B.

Figure 5A:
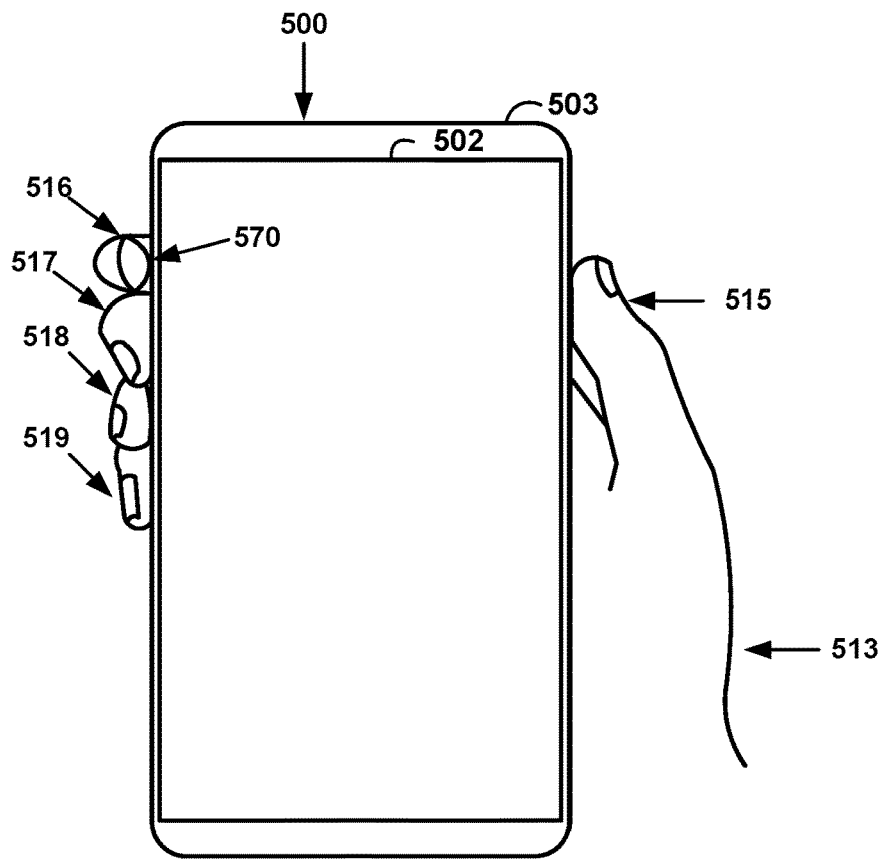
FIGS. 5A-5C are conceptual diagrams illustrating an example mobile computing device that is configured to initiate an inertia interaction mode for a tap-and-swipe edge interaction, in accordance with one or more aspects of the present disclosure.
Figure 5B:
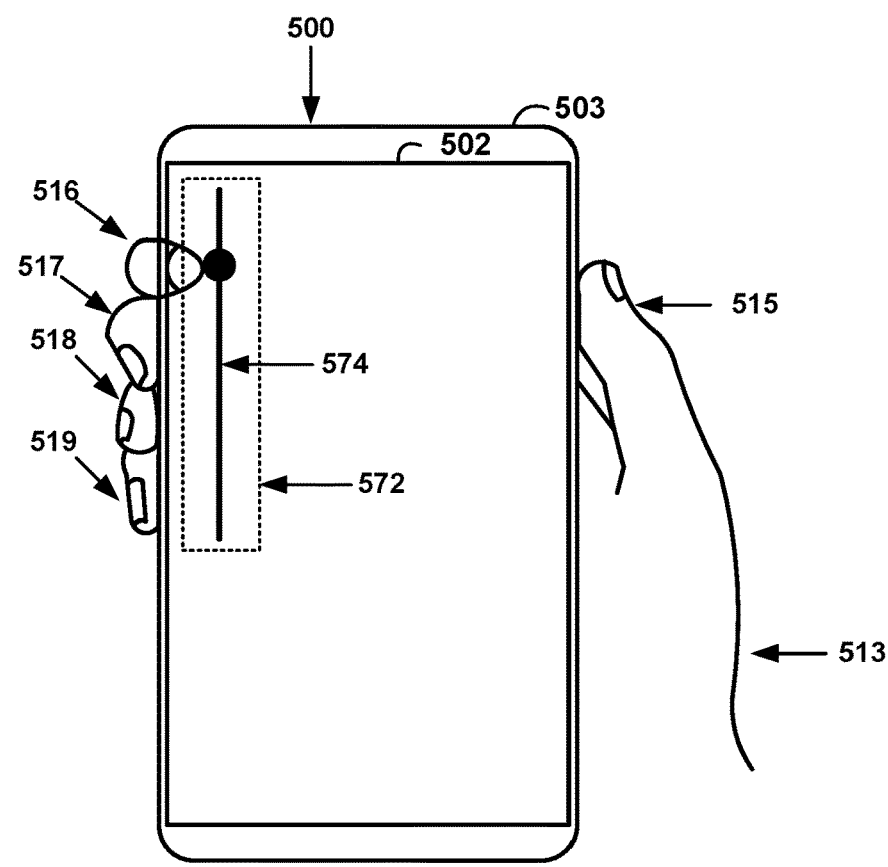
Figure 5C:
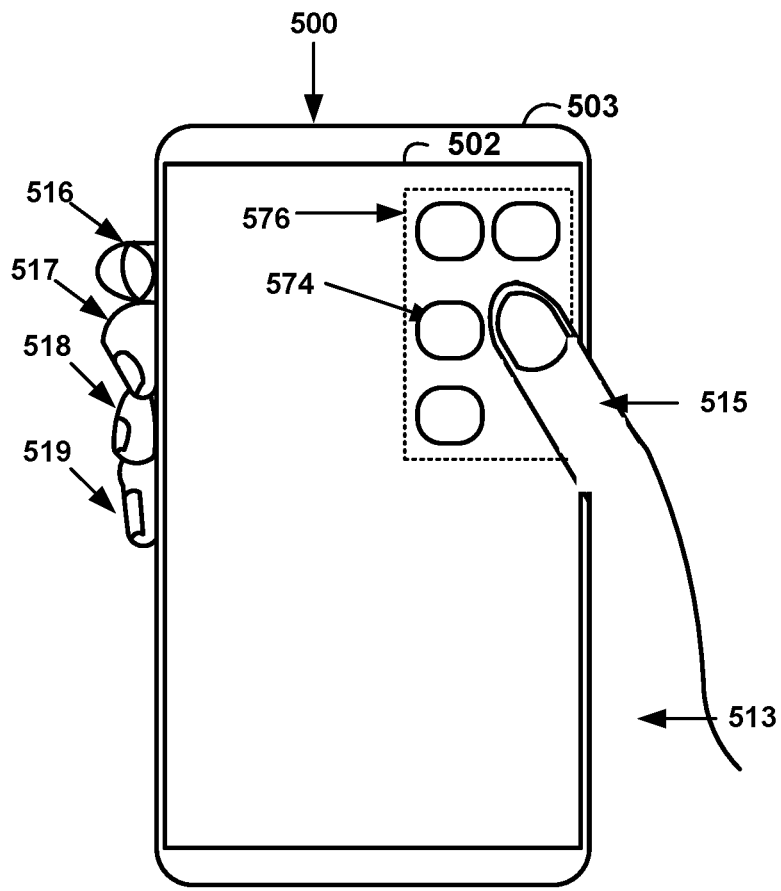

FIGS. 5A-5C are conceptual diagrams illustrating an example mobile computing device 500 that is configured to initiate an inertia interaction mode for a tap-and-swipe edge interaction, in accordance with one or more aspects of the present disclosure. In the examples of FIGS. 5A-5C, a user may use hand 513 to manipulate mobile computing device 500 using one-handed interactions. For the tap-and-swipe interactions that take place at or near the edge of mobile computing device 500, the user may first use finger 516 to tap one or more side portions 570 of housing 503, as illustrated in FIG. 5A. An edge of mobile computing device 500 may, in certain examples, comprise a region at or near a side portion (e.g., left-side portion, right-side portion, top-side portion, bottom-side portion) of housing 503, and/or near an edge of display device 502. Gesture detection module 234 may identify this gesture based on the applied force of finger 516 as well as the corresponding motion on housing 503 of mobile computing device 500, based on one or more groups of sensor signals received from sensors 204 (e.g., IMU sensor signals provided by IMU 233).

After gesture detection module 234 identifies this tap gesture, inertia mode module 242 may output graphical volume control 574 and monitor for the identification (e.g., by gesture detection module 234) of a subsequent swipe gesture at display device 502 within a defined or customizable period of time, such as a timeout period. Gesture detection module 234 may identify the swipe gesture based on one or more groups of screen capacitive sensing signals provided by sensors 204 and/or presence-sensitive input component 225. The use of the swipe gesture may invoke the edge interface of the inertia mode, and may either move along the screen edge of display device 502 for linear control, such as shown in FIG. 5B, or may move into the screen area for multi-target selection, such as shown in FIG. 5C. Although a graphical volume control 574 is illustrated in FIG. 5B, any other form of graphical user interface control (e.g., display control, another type of setting control) may be used in various other examples.

For instance, as shown in FIG. 5B, the user may use finger 516 to manipulate a graphical volume control 574 via a slide gesture performed in region 572 of display device 502. The user may use finger 516 to perform a slide gesture up within region 572 to correspondingly move up volume control 574 and increase the volume, and the user may also perform a slide gesture down within region 572 to correspondingly move down volume control 574 and decrease the volume. In response, inertia mode module 242 may output a corresponding visual adjustment to graphical volume control 574 (e.g., a visual adjustment in an upward direction for an increase in volume, or a visual adjustment in a downward direction for a decrease in volume). Volume control 574 is just one example user interface control that may be manipulated by the user during the inertia mode provided by inertia mode module 242, and is a visual indicator for inertia mode module 242 associated with one or more functions, such as increasing or decreasing a volume control element. Volume control 574 is also an example of a user interface control that may be displayed near the screen edge of display device 502, in region 572, when display device 502 includes a waterfall screen. If display device 502 has a waterfall screen or capacitive sensing on the edge, the edge user interface controls such as volume control 574 can be displayed near or around the side tap location (e.g., side portions 570).

If display device 502, however, does not have edge capacitive sensing and/or a waterfall screen, the edge user interface controls can be displayed in other areas of display device 502, such as an area or region located in proximity to an area at which thumb 515 of hand 513 may be located, such as region 576 shown in FIG. 5C. In certain cases, inertia mode module 243 may estimate region 576 at which to display volume control 574 shown in FIG. 5C using the location of side portions 570, at which finger 516 contacts housing 503, as indicated by neural network model 352. As shown in FIG. 5C, the user may use thumb 515 to interact with volume control 574 displayed in region 576 of display device 502. For example, the use may perform one or more gestures (e.g., swipe gestures) to interact with or select target objects included in volume control 574 (e.g., for multi-target selection), or to perform any other form of control function that is visually indicated in the graphical user interface for the inertia mode. To exit or pause the inertia interaction mode, in various examples, the user may perform a double back-tap gesture.

As a result, the tap-and-swipe gesture can be a gesture that is distinguishable from an unintentional grasping or touching of mobile computing device 500, and may be used as part of, e.g., a one-handed interaction to manipulate edge-based user interface controls. This gesture can be well generalized across devices with and without the waterfall screen design.

Interaction mode modules 238 of FIG. 2 also include a background mode module 243. In various examples, based at least upon gesture detection module 234 detecting one or more gestures, interaction mode selector 236 may select background mode module 243 for execution. In various examples, background mode module 243 may enable background user interface interaction using off-screen tap recognition.

In various cases, a user interface may contain a foreground layer (e.g., a layer with application shortcuts for one or more of applications 232 on a home screen) and also one or more background layers (e.g., one or more layers having background wallpaper). Wallpaper often has a frequent exposure to users, as it may appear on both a lock-screen and a home screen. A wallpaper service comprising a programmatic user interface therefore has the potential of a large impact on user interactions with mobile devices.

However, existing techniques rely solely on on-screen touch events to interact with both foreground and background services. Since they share the same interaction mechanism, it is hard for the system to recognize the user's intent and clearly separate foreground versus background interactions, particularly in a visually cluttered interface. In other words, if the user taps on the verge or border of an application icon, it may be hard for mobile computing device 200 (e.g., using UI module 230) to determine whether the user intends to open one of applications 232 associated with the icon, or to interact with the wallpaper. This ambiguity hinders the effective interaction with wallpaper services and thus confines the functionality of interactive wallpapers.

To address this issue, background mode module 243 uses off-screen tapping detected by gesture detection module 234 to interact with a background user interface, such as a wallpaper service, a game, flashcard applications or the like. Detection of such off-screen gestures allows for clear user intent discrimination of foreground versus background interactions, and thus empowers users to accomplish richer interactions with, e.g., interactive wallpaper.

Background mode module 243 uses information provided by gesture detection module 234 and machine learning module 229. Machine learning module 229 may be configured to use a neural network model (e.g., neural network model 352 shown in FIG. 3, which may comprise a multi-task convolutional neural network processing IMU signals as input) to estimate gesture (e.g., tap) location on back and/or side portions of housing 203. This estimation provides unprecedented granularity of off-screen tap detection for background user interface interaction. Each time a user taps on housing 203 of mobile computing device 200, the tap-induced motion signals may be captured and used to recognize attributes of the gesture, such as attributes 356, 357, 358, 359 shown in FIG. 3.

In various examples, for implementation of background mode module 243 and machine learning module 229 of gesture detection module 234, machine learning module 229 may utilize a light-weight convolutional neural network model and may be executed using, e.g., an embedded digital processor unit (e.g., one of processors 220) in a low power mode. In various examples, only when gesture detection module 234 detects a double tap event at housing 203 will a more computationally intensive network will be activated and executed by, e.g., a main central processing unit to yield different tap attributes, such as location and direction. By doing so, gesture detection module 234 e can potentially limit the false triggering cases (e.g., unintentional interaction with the wallpaper) and maximally reduce the power consumption.

Background mode module 243 may enable user interaction with a background user interface, such as an interactive wallpaper that provides at least one visual indicator of the interaction mode and various associated functions, using off-screen tap gestures (e.g., back-tap and/or side-tap gestures), allowing users to have clear separation between foreground and background interactions. That is, a user may interact with a foreground user interface or applications using on-screen gestures at display device 202, and may alternatively interact with a background user interface or applications using off-screen gestures performed at one or more portions of housing 203. Users can use back-tap or edge-tap gestures to interact with a background user interface, such as an interactive wallpaper, which may not in various cases respond to on-screen touch events. This technique may open up a new venue for user interaction. Such interaction can be done even in lock-screen mode, and thus allows users to have the fastest access to various such as flashcard services, news feed services, or light-weight games, even before unlocking it or without the need to unlock. In general, an edge gesture such as an edge-tap gesture may be performed at one or more side portions of housing 203 and/or at one or more portions of display device 202 (e.g., edge portions of display device 202).

For a wallpaper service that shows news feeds, after a user has initially performed a double back-tap gesture at a back portion of housing 203 to cause background mode module 243 to initiate a background interaction mode, a user perform another back-tap gesture to cycle through to the next news feed, or may perform an edge-tap gesture at a side portion of housing 203 and/or at a portion of display device 202 to switch to another news category. Cycling through to the next news feed, or switching to another news category, may comprise removing the current background user interface elements from display (e.g., current news feed element) and outputting one or more new background user interface elements (e.g., new news feed elements in the same or different news category) for display. Gesture detection module 234 may detect any gestures based on receipt of one or more groups of sensor signals from sensors 204 (e.g., IMU sensor signals provided by IMU 233). In some cases, the wallpaper service may also include or provide a light-weight game, such as a doodle game. In these cases, once the user has performed a double back-tap gesture to initiate the background interaction mode, causing background mode module 243 to execute a game as a background user interface application, the user may perform one or more additional back-tap gestures at different locations at a back portion of housing 203 to interact with or play the game, providing the user with the control flexibility beyond discrete event-based signals. For example, the user may perform back-tap gestures at different locations at a back portion of housing 203 to cause the game to perform different actions. The visual output provided by background mode module 243 may comprise one or more visual indicators for the background mode that are associated with one or more respective functions, as described in further detail below.

Figure 6A:
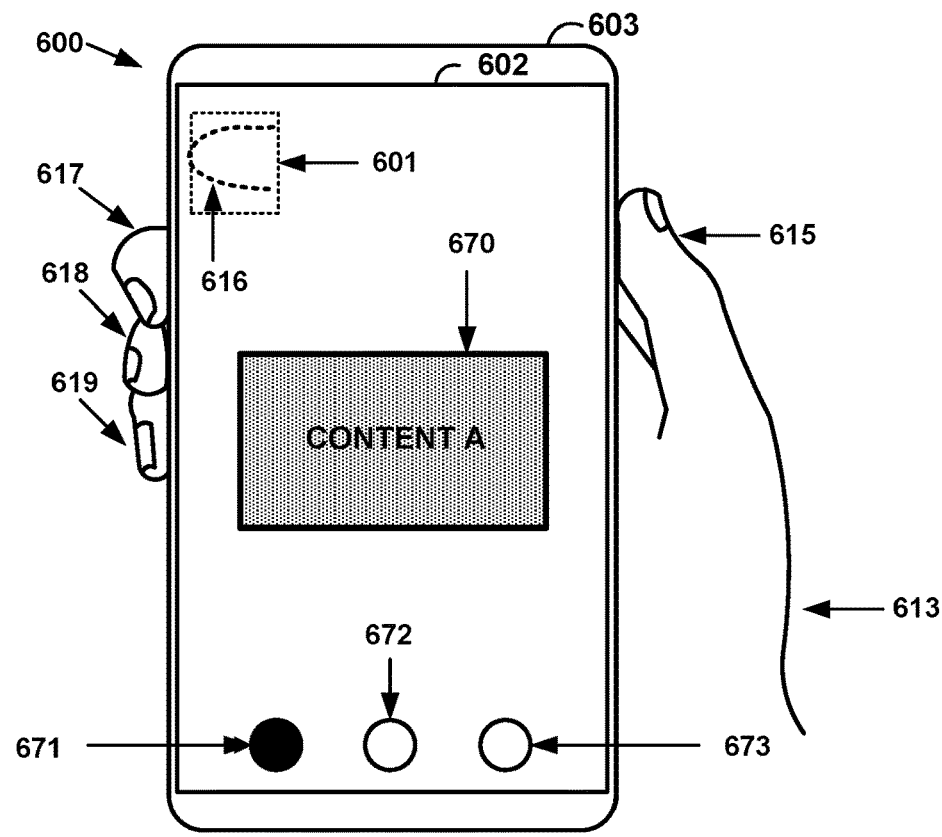
FIGS. 6A-6C are conceptual diagrams illustrating an example mobile computing device that is configured to initiate a background mode for background user interface interaction, in accordance with one or more aspects of the present disclosure.
Figure 6B:
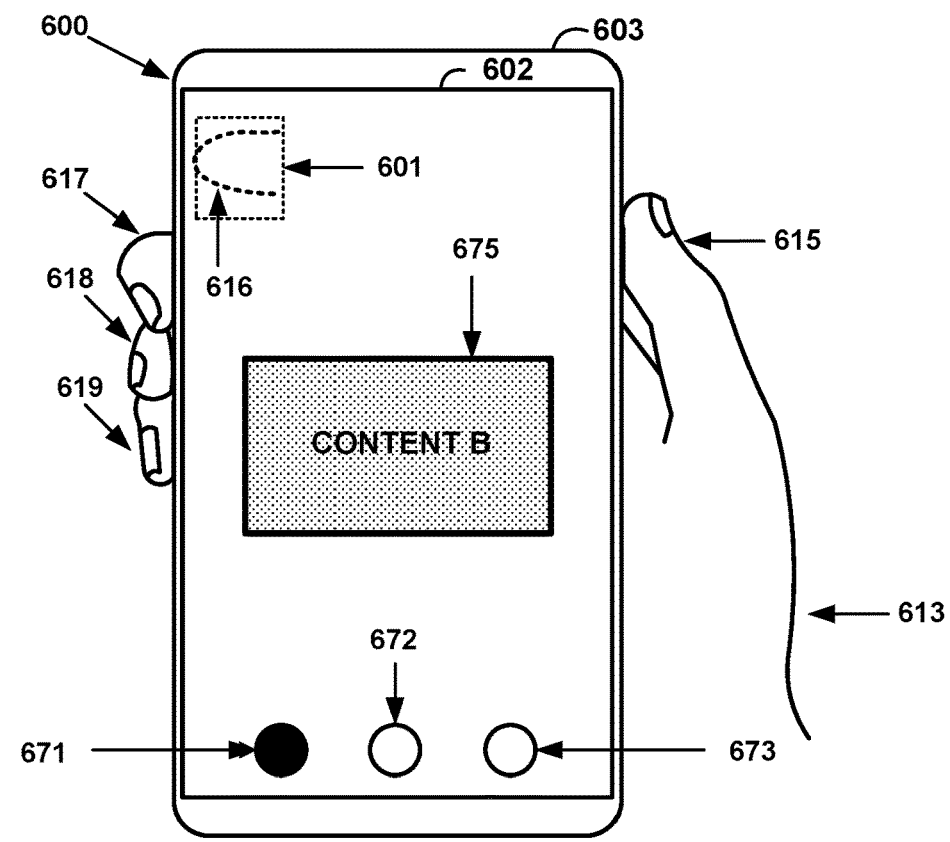
Figure 6C:
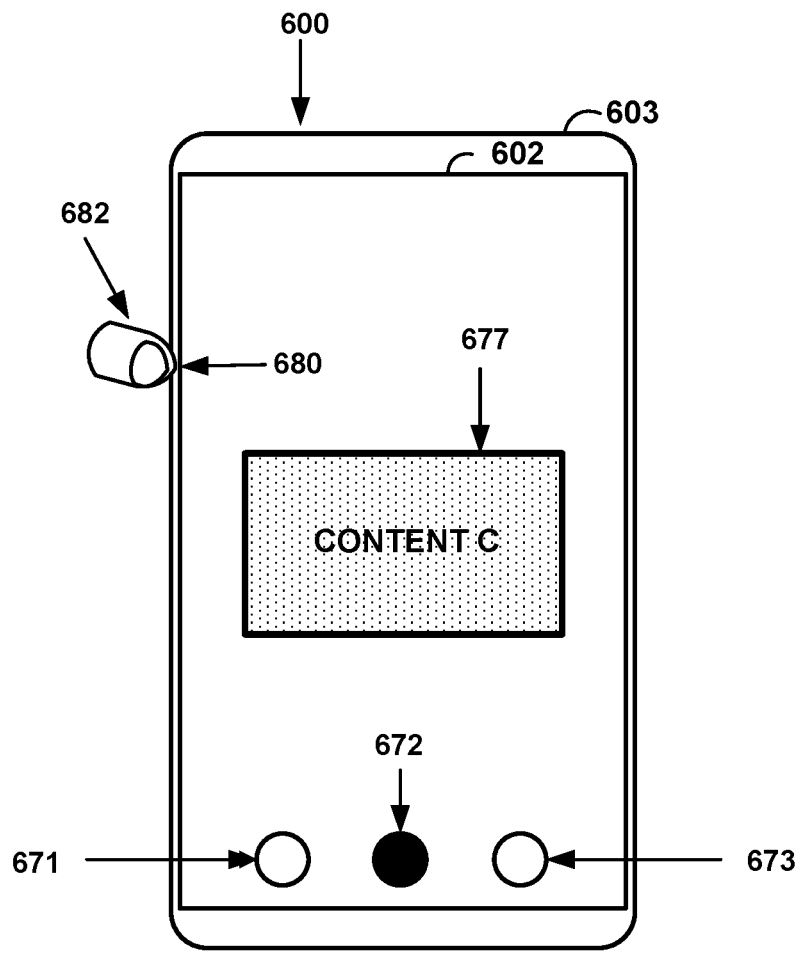

FIGS. 6A-6C are conceptual diagrams illustrating an example mobile computing device that is configured to initiate background mode module 243 for background user interface interaction, in accordance with one or more aspects of the present disclosure. These figures illustrate examples of off-screen tapping for background user interface (e.g. wallpaper) interaction. Users can invoke and pause the background interface interaction by, e.g., a back double-tap gesture, and may perform a subsequent back-tap gesture or edge-tap gesture to perform a specific control.

Specifically, a user can use a simple off-screen gesture (e.g. back-double tap) to start interacting with the background interface. The user may then tap different locations on housing 603 of mobile computing device 600. For instance, the user may use finger 616 of hand 613 to perform a back-tap (e.g., double back-tap) gesture at one or more back portions 601 of housing 603, as indicated in FIG. 6A. Gesture detection module 234 may identify this gesture, and interaction mode selector 236 may select background mode module 243 for execution. Upon execution, display device 602 may output a background user interface element 670 and indicators 671, 672, 673, where indicator may be prominently displayed in some format to indicate that it is the currently selected indicator. For example, background user interface element 670 may comprise a news feed item provided by a wallpaper service of background mode module 243, and indicators 671, 672, 673 may correspond to different news categories (e.g., sports, weather, local news). If currently selected indicator 671 is associated with a sports category, background user interface element 670 may include sports-related news information that is output for display at display device 602. In another example, background user interface element 670 may comprise a language-based flashcard provided by the wallpaper service to help with the user with language learning, and indicators 671, 672, 673 may correspond to different categories of flashcards (e.g., animals, toys, clothing). Background user interface elements may, in certain examples, comprise one or more visual flashcard elements, visual news elements, or other types of elements that are output for display.

At a later point, the user may perform a subsequent back-tap gesture (e.g., single back-tap) gesture to change the background user interface element that is output for display in the same category specified by indicator 671. Thus, if currently selected indicator 671 is associated with a sports news category, the user may use finger 616 to perform a back-tap gesture at back portions 601 of housing 603, as detected by gesture detection module 234, to cause background mode module 243 to remove background user interface element 670 from display, and output instead a different background user interface element 675 at display device 602, as indicated in FIG. 6B. This element 675 may comprise a new sports-related news item in the sports news category that is associated with indicator 671. In another example, if currently selected indicator 671 is associated with animal language category, the user may use finger 616 to perform a back-tap gesture at back portions 601 of housing 603 to cause background mode module 243 to output background user interface element 675, which may comprise a new language-based flashcard element in the animal language category associated with indicator 671.

As also shown in FIG. 6C, the user may perform a side or edge-tap (e.g., single edge-tap) gesture at one or more edge or side portions 680 of housing 603 and/or at one or more portions of display device 602 (e.g., one or more edge portions of display device 602) to change the category of background user interface element that is output for display at display device 602. FIG. 6C illustrates that the user uses a finger 682 to perform this gesture. Finger 682 may be any user finger, such as a finger of hand 613 or another hand of the user.

Upon gesture detection module 234 identifying this gesture, background mode module 243 may change the category of information that is output in the background user interface interaction. For example, background mode module 243 may switch to a second category associated with indicator 672, and may remove background user interface element 675 from display, and instead output background user interface element 677 for this category. As shown in FIG. 6C, background mode module 243 may visually emphasize or otherwise prominently display indicator 672 as the currently selected category.

Thus, if currently selected indicator 672 is associated with a weather news category, the user may use finger 682 to perform an edge-tap gesture at one or more side portions 680 of housing 603 and/or at one or more portions of display device 602, as detected by gesture detection module 234, to cause background mode module 243 to output a different background user interface element 677 at display device 602 for the weather news category. This element 677 may comprise a new weather-related news item in the weather news category that is associated with indicator 672. In another example, if currently selected indicator 672 is associated with games language category, the user may use finger 682 to perform an edge-tap gesture to cause background mode module 243 to output background user interface element 677, which may comprise a new language-based flashcard element in the games language category associated with indicator 672. To exit or pause the background interaction mode, in various examples, the user may perform a double back-tap gesture.

As a result, the use of off-screen tap recognition for background user interface interaction opens a myriad of new opportunities. In various cases, this type of interaction may enable quick access to, e.g., a user's favorite background application or service without necessarily even having to unlock the screen and/or interfere with gesture interactions for applications executed in the foreground.

Figure 7:
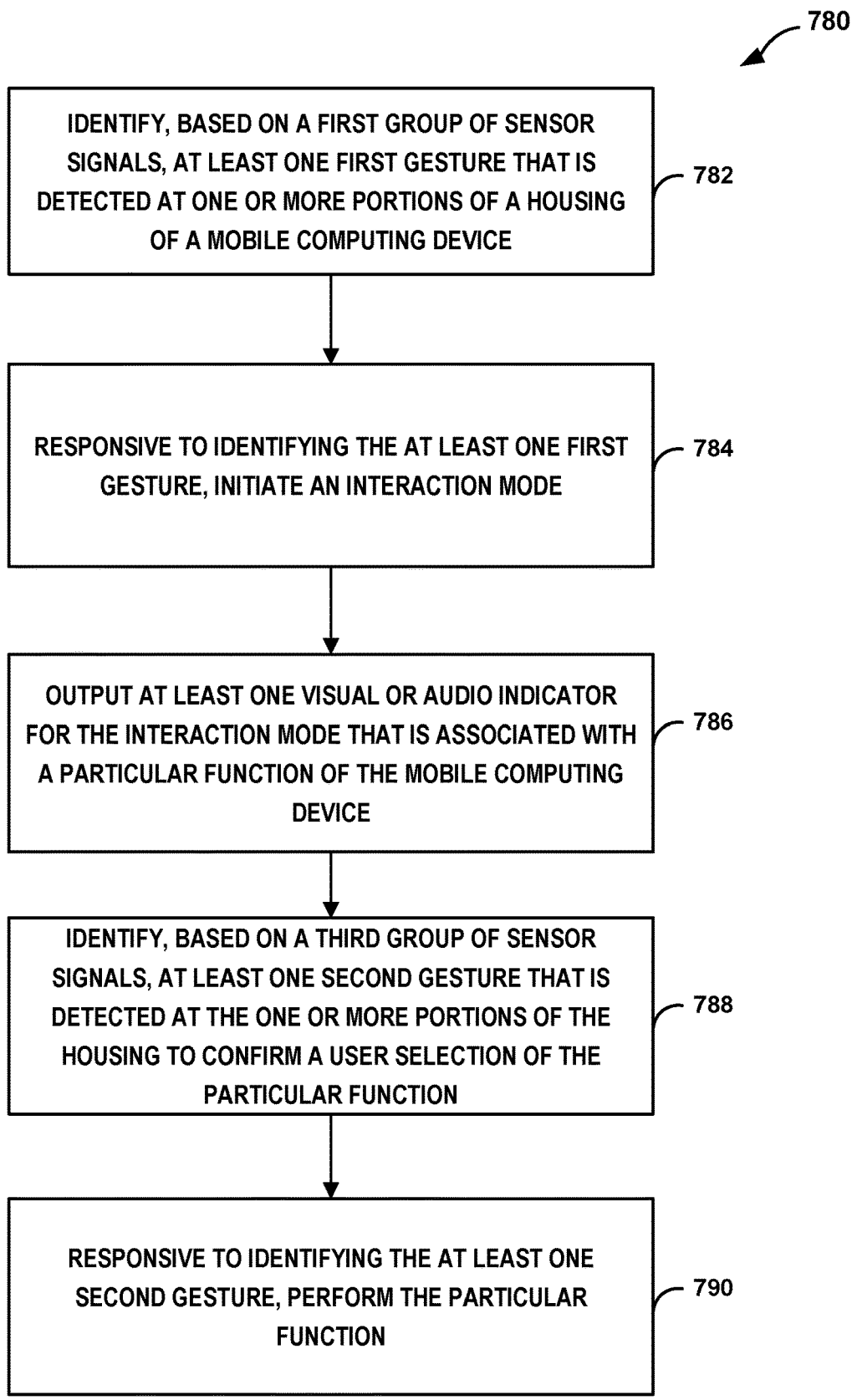
FIG. 7 is a flow diagram illustrating example operations of a mobile computing device, in accordance with one or more aspects of the present disclosure.

FIG. 7 is a flow diagram illustrating example operations of a process 780 that is performed by a mobile computing device, such as mobile computing device 100 (FIG. 1) and/or mobile computing device 200 (FIG. 2), in accordance with one or more aspects of the present disclosure. For purposes of illustration only, the operations of FIG. 7 are described with reference to mobile computing device 200 shown in FIG. 2.

Process 780 includes identifying (782), by a mobile computing device (e.g., by gesture detection module 234 of mobile computing device 200) that includes a housing (e.g., housing 203) and a presence-sensitive display device (e.g., display device 202), and based on a first group of sensor signals provided at least by an inertial measurement unit (e.g., inertial measurement unit 233), at least one first gesture that is performed at one or more portions of the housing. The one or more portions of the housing are separate from the presence-sensitive display device, and the inertial measurement unit is included in one or more sensors (e.g., sensors 204) of the mobile computing device.

Process 780 also includes, in response to identifying the at least one first gesture, initiating (784), by the mobile computing device (e.g., using interaction mode selector 236 and/or interaction mode module 238), an interaction mode, and outputting (786) at least one visual or audio indicator for the interaction mode that is associated with a particular function of the mobile computing device. Process 780 also includes identifying (788), by the mobile computing device (e.g., using gesture detection module 234) and based on a third group of sensor signals provided by the one or more sensors, at least one second gesture that is performed at the one or more portions of the housing to confirm a user selection of the particular function that is associated with the at least one visual or audio indicator for the interaction mode. Responsive to identifying the at least one second gesture, process 780 further includes performing (790), by the mobile computing device (e.g., using interaction mode modules 238), the particular function.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
identifying, by a mobile computing device that includes a housing and a presence-sensitive display device, and based on a first group of sensor signals provided at least by an inertial measurement unit, at least one first gesture that is performed at one or more portions of the housing, wherein the one or more portions of the housing are separate from the presence-sensitive display device, and wherein the inertial measurement unit is included in one or more sensors of the mobile computing device;
selecting, based on the at least one first gesture, an interaction mode from a plurality of interaction modes, wherein the plurality of interaction modes includes three or more interaction modes;
responsive to selecting the interaction mode, initiating, by the mobile computing device, the interaction mode;
outputting, by the mobile computing device, at least one visual or audio indicator for the interaction mode that is associated with a particular function of the mobile computing device;
identifying, by the mobile computing device and based on a second group of sensor signals provided by the one or more sensors, at least one second gesture that is performed at the one or more portions of the housing to confirm a user selection of the particular function that is associated with the at least one visual or audio indicator for the interaction mode; and
responsive to identifying the at least one second gesture, performing, by the mobile computing device, the particular function.

2. The method of claim 1,
wherein identifying the at least one first gesture comprises identifying, by the mobile computing device and based on the first group of sensor signals provided at least by the inertial measurement unit, at least one first tap gesture that is performed at the one or more portions of the housing,
wherein the presence-sensitive display device is located on a front side of the mobile computing device, and
wherein the one or more portions of the housing comprise one or more of (i) at least one side portion of the housing that is located on a side of the mobile computing device that is adjacent to the front side of the mobile computing device, or (ii) at least one back portion of the housing that is located on a back side of the mobile computing device, the back side being opposite to the front side of the mobile computing device.

3. The method of claim 2, wherein the interaction mode comprises an accessibility interaction mode, wherein the one or more sensors further include the presence-sensitive display device, and the method further comprising:
identifying, by the mobile computing device and based on a third group of sensor signals provided by the presence-sensitive display device, at least one third gesture that is performed at a region of a graphical user interface that is output at the presence-sensitive display device,
wherein outputting the at least one visual or audio indicator for the accessibility interaction mode comprises outputting, by the mobile computing device and based on the region of the graphical user interface at which the at least one third gesture is performed, the at least one visual or audio indicator for the accessibility interaction mode.

4. The method of claim 3,
wherein outputting the at least one visual or audio indicator for the accessibility interaction mode comprises outputting, by the mobile computing device, audio speech indicating content that is displayed in the region of the graphical user interface at which the third gesture is performed, wherein identifying the at least one second gesture comprises identifying, by the mobile computing device and based on the second group of sensor signals provided at least by the inertial measurement unit, a back-tap gesture that is performed at the at least one back portion of the housing to confirm the user selection of the particular function that is associated with the content displayed in the region of the graphical user interface.

5. The method of claim 4,
wherein the content displayed in the region of the graphical user interface at which the third gesture is performed comprises one of (i) an application icon, (ii) a web link, or (iii) a key of a graphical keyboard, and
wherein performing the particular function comprises one of:
executing, by the mobile computing device, an application associated with the application icon;
accessing, by the mobile computing device, a website associated with the web link; or
selecting, by the mobile computing device, the key of the graphical keyboard.

6. The method of claim 3,
wherein outputting the at least one visual or audio indicator for the accessibility interaction mode comprises outputting, by the mobile computing device, a visual magnification of content that is displayed in the region of the graphical user interface at which the third gesture is performed,
wherein identifying the at least one second gesture comprises identifying, by the mobile computing device and based on the second group of sensor signals provided at least by the inertial measurement unit, a back-tap gesture that is performed at the at least one back portion of the housing to confirm the user selection of the particular function that is associated with the content displayed in the region of the graphical user interface.

7. The method of claim 2, wherein the interaction mode comprises an assistive interaction mode, and the method further comprising:
responsive to initiating the assistive interaction mode, outputting, by the mobile computing device and for display at the presence-sensitive display device, a visual menu that includes a plurality of menu items; and
identifying, by the mobile computing device and based on a third group of sensor signals provided at least by the inertial measurement unit, a tilt gesture associated with a detected movement or rotation of the mobile computing device,
wherein outputting the at least one visual or audio indicator for the assistive interaction mode comprises outputting, by the mobile computing device and for display at the presence-sensitive display device, based on at least one of a direction or an orientation of the detected movement or rotation of the mobile computing device, a menu item from the plurality of menu items, the menu item being associated with the particular function,
wherein identifying the at least one second gesture comprises identifying, by the mobile computing device and based on the second group of sensor signals provided at least by the inertial measurement unit, a back-tap gesture that is performed at the at least one back portion of the housing to confirm the user selection of the particular function that is associated with the menu item.

8. The method of claim 7, wherein the particular function associated with the menu item is one of a scroll function, a scroll down function, a page back function, or a switch application function.

9. The method of claim 2,
wherein the interaction mode comprises a background interaction mode,
wherein outputting the at least one visual or audio indicator for the background interaction mode comprises outputting, by the mobile computing device and for display at the presence-sensitive display device, interactive wallpaper comprising one or more background user interface elements associated with the particular function,
wherein identifying the at least one second gesture comprises identifying, by the mobile computing device and based on the second group of sensor signals provided by the one or more sensors, the at least one second gesture to confirm the user selection of the particular function associated with the one or more background user interface elements, and
wherein the at least one second gesture comprises one of (i) an edge-tap gesture that is performed at one or more of the at least one side portion of the housing or at least one portion of the presence-sensitive display device, or (ii) a back-tap gesture that is performed at the at least one back portion of the housing.

10. The method of claim 9, wherein the one or more background user interface elements comprise one or more visual flashcard elements or visual news elements for display at the presence-sensitive display device.

11. The method of claim 9,
wherein one or more background user interface elements comprise a first group of background user interface elements, and
wherein performing the particular function further comprises:
removing, by the mobile computing device, the first group of background user interface elements from display at the presence-sensitive display device; and
outputting, by the mobile computing device and for display at the presence-sensitive display, a second group of background user interface elements.

12. The method of claim 2,
wherein the interaction mode comprises an inertia interaction mode,
wherein the one or more sensors further include the presence-sensitive display device,
wherein identifying the at least one first gesture comprises identifying, by the mobile computing device and based on the first group of sensor signals provided at least by the inertial measurement unit, an edge-tap gesture that is performed at one or more of the at least one side portion of the housing or at least one portion of the presence-sensitive display device,
wherein outputting the at least one visual or audio indicator for the inertia interaction mode comprises outputting, by the mobile computing device and for display at the presence-sensitive display device in a region of a graphical user interface, one or more user interface controls, and
wherein identifying the at least one second gesture comprises identifying, by the mobile computing device and based on the second group of sensor signals provided by the presence-sensitive display device, the at least one second gesture that is performed at the region of the graphical user interface to confirm the user selection of the particular function associated with the one or more user interface controls.

13. The method of claim 12,
wherein the at least one gesture comprises a slide gesture performed at the region of the graphical user interface, and
wherein performing the particular function comprises outputting, by the mobile computing device and for display at the presence-sensitive display device, a visual adjustment to the one or more user interface controls.

14. The method of claim 2,
wherein identifying the at least one first tap gesture comprises identifying, by the mobile computing device and based on the first group of sensor signals provided at least by the inertial measurement unit, a double back-tap gesture that is performed at the at least one back portion of the housing.

15. The method of claim 2,
wherein identifying the at least one first tap gesture that is performed at the one or more portions of the housing comprises analyzing, by the mobile computing device using a machine learning module and a neural network model, the first group of sensors signals provided at least by the inertial measurement unit to determine one or more attributes of the at least one first tap gesture, the one or more attributes comprising one or more of (i) a location associated with the at least one first tap gesture, (ii) a gesture condition associated with the at least one first tap gesture, (iii) a force associated with the at least one first tap gesture, or (iv) a direction associated with the at least one first tap gesture.

16. The method of claim 1, further comprising:
identifying, by the mobile computing device, based on a further group of sensor signals provided by the one or more sensors, at least one further gesture that is performed at one or more portions of the housing to exit the interaction mode; and
responsive to identifying the at least one further gesture, exiting, by the mobile computing device, the interaction mode.

17. A mobile computing device, comprising:
a presence-sensitive display device;
a housing that is coupled to the presence-sensitive display device;
one or more sensors that include an inertial measurement unit;
at least one processor; and
a computer-readable storage device configured to store instructions that are executable by the at least one processor to:
identify, based on a first group of sensor signals provided at least by the inertial measurement unit, at least one first gesture that is performed at one or more portions of the housing, wherein the one or more portions of the housing are separate from the presence-sensitive display device;
select, based on the at least one first gesture, an interaction mode from a plurality of interaction modes, wherein the plurality of interaction modes includes three or more interaction modes;
responsive to selecting the interaction mode, initiate the interaction mode;
output at least one visual or audio indicator for the interaction mode that is associated with a particular function of the mobile computing device;
identify, based on a third group of sensor signals provided by the one or more sensors, at least one second gesture that is performed at the one or more portions of the housing to confirm a user selection of the particular function that is associated with the at least one visual or audio indicator for the interaction mode; and
responsive to identifying the at least one second gesture, perform the particular function.

18. A computer-readable storage device storing instructions that, when executed, cause at least one processor of a mobile computing device to:
identify, based on a first group of sensor signals provided at least by an inertial measurement unit, at least one first gesture that is performed at one or more portions of a housing of the mobile computing device, wherein the one or more portions of the housing are separate from a presence-sensitive display device, and wherein the inertial measurement unit is included in one or more sensors of the mobile computing device;
select, based on the at least one first gesture, an interaction mode from a plurality of interaction modes, wherein the plurality of interaction modes includes three or more interaction modes;
responsive to selecting the interaction mode, initiate the interaction mode;
output at least one visual or audio indicator for the interaction mode that is associated with a particular function of the mobile computing device;
identify, based on a third group of sensor signals provided by the one or more sensors, at least one second gesture that is performed at the one or more portions of the housing to confirm a user selection of the particular function that is associated with the at least one visual or audio indicator for the interaction mode; and
responsive to identifying the at least one second gesture, perform the particular function.

19. The method of claim 1, wherein:
while the mobile computing device remains in the interaction mode, the mobile computing device is configured to perform a plurality of functions based on detected additional gestures performed at the housing; and
the particular function is from the plurality of functions.

20. The method of claim 19, wherein the plurality of functions are exclusive to the interaction mode.

* * * * *